(12) United States Patent
Matsubara et al.

(10) Patent No.: US 8,634,978 B2
(45) Date of Patent: Jan. 21, 2014

(54) POWER TRANSMITTING APPARATUS FOR VEHICLE

(75) Inventors: Tooru Matsubara, Toyota (JP); Atsushi Tabata, Okazaki (JP); Masakazu Kaifuku, Okazaki (JP)

(73) Assignees: Toyota Jidosha Kabushiki Kaisha, Aichi (JP); Aisin AW Co., Ltd., Aichi-Ken (JP)

( * ) Notice: Subject to any disclaimer, the term of this patent is extended or adjusted under 35 U.S.C. 154(b) by 198 days.

(21) Appl. No.: 13/131,212

(22) PCT Filed: Jan. 23, 2009

(86) PCT No.: PCT/JP2009/051131
§ 371 (c)(1),
(2), (4) Date: May 25, 2011

(87) PCT Pub. No.: WO2010/061639
PCT Pub. Date: Jun. 3, 2010

(65) Prior Publication Data
US 2011/0231048 A1    Sep. 22, 2011

(30) Foreign Application Priority Data
Nov. 26, 2008 (JP) .................... 2008-301597

(51) Int. Cl.
*G05D 17/00* (2006.01)
*G05D 17/02* (2006.01)

(52) U.S. Cl.
USPC .................. 701/22; 701/54; 180/65.235

(58) Field of Classification Search
USPC .......... 701/22, 36, 37, 51, 54, 88; 180/65.1, 180/65.21, 65.225, 65.235, 65.275
See application file for complete search history.

(56) References Cited

U.S. PATENT DOCUMENTS

| | | | |
|---|---|---|---|
| 2002/0025887 A1* | 2/2002 | Netzer | 477/156 |
| 2005/0209760 A1* | 9/2005 | Tabata et al. | 701/53 |
| 2006/0166784 A1 | 7/2006 | Tabata et al. | |
| 2008/0228362 A1* | 9/2008 | Muller et al. | 701/54 |

FOREIGN PATENT DOCUMENTS

| | | |
|---|---|---|
| JP | 2000-002327 A | 1/2000 |
| JP | 2003-011682 A | 1/2003 |
| JP | 2005-348532 A | 12/2005 |
| JP | 2006-103471 A | 4/2006 |
| JP | 2007-55287 A | 3/2007 |
| JP | 2007-196752 A | 8/2007 |
| JP | 2008-56235 A | 3/2008 |
| JP | 2008-296610 A | 12/2008 |

* cited by examiner

*Primary Examiner* — Mary Cheung
*Assistant Examiner* — Rodney Butler
(74) *Attorney, Agent, or Firm* — Sughrue Mion, PLLC

(57) ABSTRACT

It is provided a power transmitting apparatus for a vehicle that is disposed in a power transmission path between an engine and driving wheels and that has an electric differential portion whose differential state between an input rotation speed and an output rotation speed is controlled by controlling a driving state through an electric motor coupled to a rotating element of the differential portion, wherein for varying the output rotation speed of the electric differential portion, at a predetermined time point, an amount of divergence between an actual rotation speed and a target rotation speed of the engine is calculated and the target rotation speed of the engine is set such that the amount of divergence converges at a predetermined slope and the convergence of the amount of divergence is delayed compared to that without any control.

8 Claims, 12 Drawing Sheets

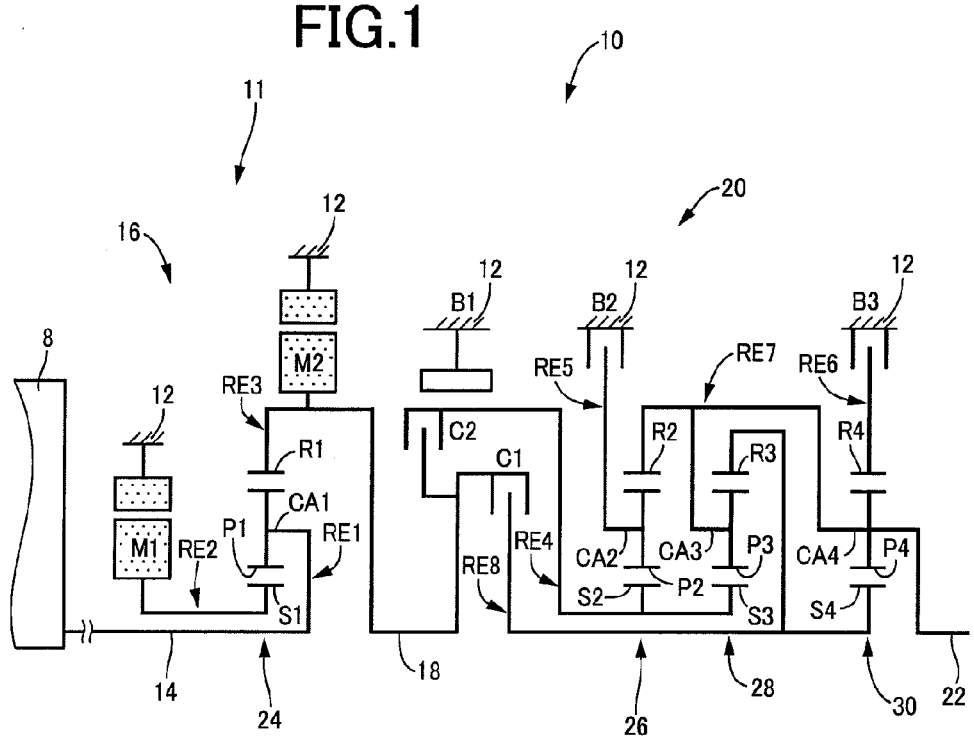

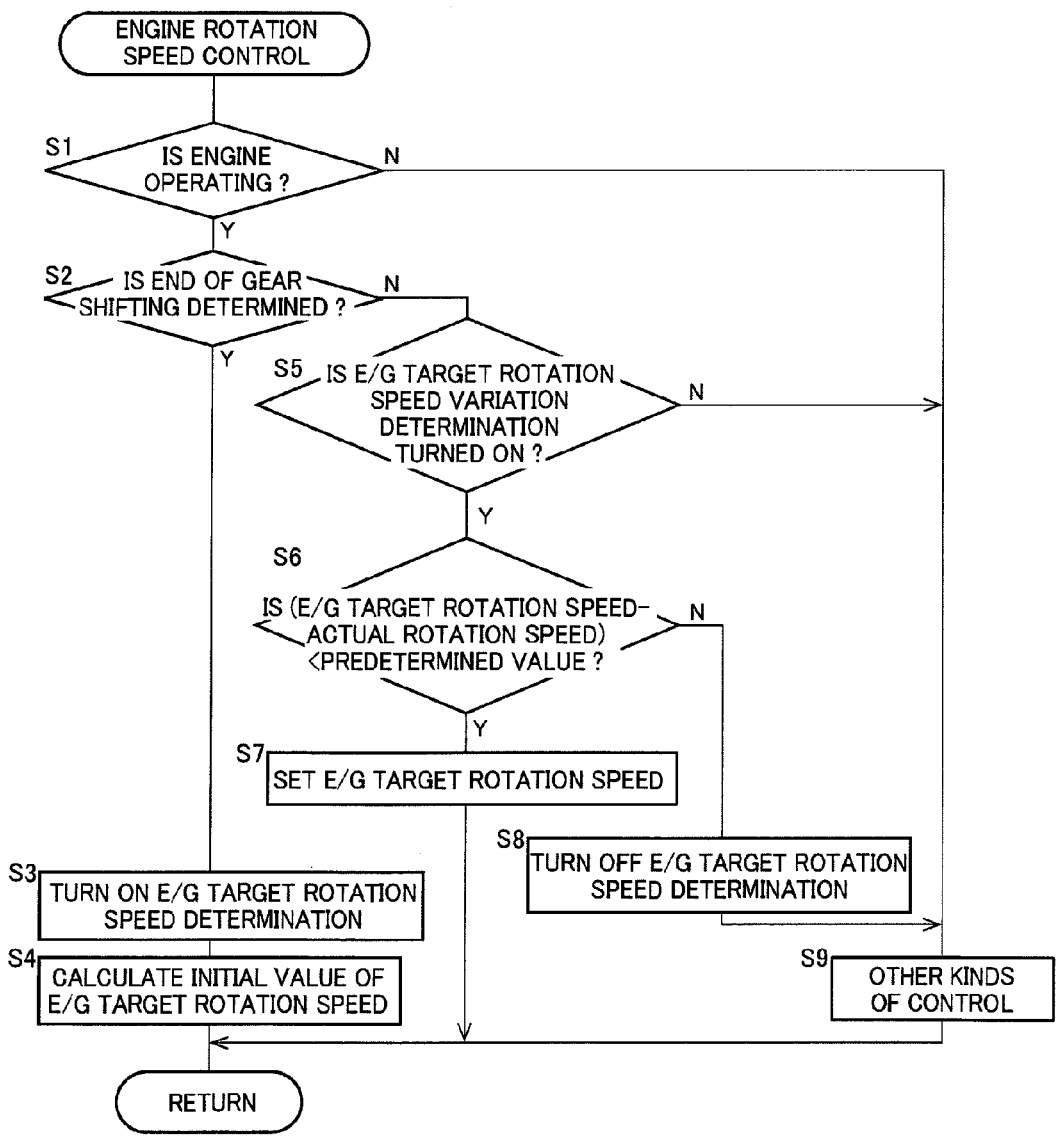

POWER TRANSMITTING APPARATUS FOR VEHICLE

CROSS REFERENCE TO RELATED APPLICATIONS

This application is a National Stage of International Application No. PCT/JP2009/051131 filed Jan. 23, 2009, claiming priority based on Japanese Patent Application No. 2008-301597, filed Nov. 26, 2008, the contents of all of which are incorporated herein by reference in their entirety.

TECHNICAL FIELD

The present invention relates to a hybrid-type power transmitting apparatus for a vehicle that includes an electric differential portion, and, more particularly, to an improvement to suppress occurrence of relatively rapid output fluctuation observed when an output rotation speed is varied.

BACKGROUND ART

A hybrid-type power transmitting apparatus for a vehicle is known that is disposed in a power transmission path between an engine and driving wheels and that includes an electric differential portion whose differential state between its input rotation speed and its output rotation speed is controlled by controlling the driving state through an electric motor coupled to a rotating element of a differential portion. A power transmitting apparatus for a vehicle is proposed that includes a mechanical gear shifting portion constituting a portion of the power transmission path between the electric differential portion and the driving wheels, as an example of the above power transmitting apparatus for a vehicle. For example, a control apparatus of a driving apparatus for a vehicle described in Patent Document 1 is the above proposed apparatus. In such a technique, control is executed of the rotation speed of the engine by the electric motor when necessary. For example, after gear shifting of the mechanical gear shifting portion comes to an end, the rotation speed of the engine is controlled through control of the output of the electric motor such that the actual rotation speed of the engine quickly reaches the target rotation speed thereof.

Patent Document 1: Japanese Laid-Open Patent Publication 2005-348532
Patent Document 2: Japanese Laid-Open Patent Publication 2008-56235
Patent Document 3: Japanese Laid-Open Patent Publication 2006-103471

SUMMARY OF THE INVENTION

Problem that the Invention is to Solve

However, in the conventional technique, for example, when the rotation speed of the engine is controlled by the electric motor after the gear shifting of the mechanical gear shifting portion comes to an end, the case can be considered where the divergence between the actual rotation speed and the target rotation speed of the engine is increased due to the inertia torque of each element involved in the gear shifting. When the rotation speed of the engine is controlled by the electric motor in the above state, the output of the electric motor is varied such that an amount of divergence between the actual rotation speed and the target rotation speed of the engine is rapidly reduced. Therefore, the directly transmitted torque to an output shaft of the power transmitting apparatus may fluctuate and, thereby, relatively rapid fluctuation of the torque of the output shaft may occur. Therefore, development of a power transmitting apparatus for a vehicle is demanded that suppresses the occurrence of the relatively rapid fluctuation of the torque of the output shaft of the power transmitting apparatus when the output rotation speed of the electric differential portion is varied.

The present invention was conceived in view of the above circumstances in the background and the object thereof is to provide a power transmitting apparatus for a vehicle that suppresses occurrence of relatively rapid fluctuation of the torque of an output shaft of a power transmitting apparatus observed when the output rotation speed of an electric differential portion is varied.

Means to Solve the Problems

To achieve the above object, the present invention provides a power transmitting apparatus for a vehicle that is disposed in a power transmission path between an engine and driving wheels and that has an electric differential portion whose differential state between an input rotation speed and an output rotation speed is controlled by controlling a driving state through an electric motor coupled to a rotating element of the differential portion, wherein for varying the output rotation speed of the electric differential portion, at a predetermined time point, an amount of divergence between an actual rotation speed and a target rotation speed of the engine is calculated and the target rotation speed of the engine is set such that the amount of divergence converges at a predetermined slope.

The Effects of the Invention

As above, for varying the output rotation speed of the electric differential portion, at a predetermined time point, the amount of divergence between the actual rotation speed and the target rotation speed of the engine is calculated and the target rotation speed is set such that the amount of divergence converges at the predetermined slope. Therefore, for the control of the engine rotation speed by the electric motor, fluctuation of the rotation speed of the output shaft of the electric differential portion can suitably be suppressed. The power transmitting apparatus for a vehicle can be provided that suppresses the occurrence of the relatively rapid variation of the torque of the output shaft of the power transmitting apparatus when the output rotation speed of the electric differential portion is varied.

Preferably, for varying the output rotation speed of the electric differential portion, at the predetermined time point, the amount of divergence between the actual rotation speed and the target rotation speed of the engine is calculated and the setting is executed of the target rotation speed such that the convergence of the amount of divergence is delayed compared to that without the control. As above, for the control of the engine rotation speed by the electric motor, fluctuation of rotation speed of the output shaft of the electric differential portion can suitably be suppressed in a practical aspect.

Preferably, the mechanical shifting portion that constitutes a portion of the power transmission path between the electric differential portion and the driving wheels is included, and the predetermined time point is the time point at which the shifting of the mechanical shifting portion comes to an end. As above, fluctuation of the output shaft rotation speed of the electric differential portion can suitably be suppressed for a time period after the shifting comes to an end during which relatively rapid torque variation of the output shaft of the power transmitting apparatus tends to occur.

Preferably, for the predetermined time period from the time point at which the shifting of the mechanical shifting portion comes to an end, the target rotation speed of the engine is set such that the amount of divergence between the actual rotation speed and the target rotation speed of the engine is constant. As above, fluctuation of the rotation speed of the output shaft of the electric differential portion can suitably be suppressed in a practical aspect for the time period after the shifting comes to an end during which relatively rapid torque variation of the output shaft of the power transmitting apparatus tends to occur.

Preferably, when the shifting of the mechanical shifting portion comes to an end, the target rotation speed of the engine is set to be the value that is acquired by adding the predetermined value that is determined in advance to the actual rotation speed of the engine. As above, the amount of divergence can be reduced in the initial stage of the control and the convergence thereof can be expedited for the time period after the shifting comes to an end during which relatively rapid torque variation of the output shaft of the power transmitting apparatus tends to occur.

Preferably, the mechanical shifting portion that constitutes a portion of the power transmission path between the electric differential portion and the driving wheels is included, and the predetermined time point is the time point at which the switching of the mechanical shifting portion from its neutral state to its power transmission state is completed. As above, the fluctuation of the rotation speed of the output shaft of the electric differential portion can suitably be suppressed for a time period after the switching is completed from the neutral state to the power transmission state during which relatively rapid torque variation of the output shaft of the power transmitting apparatus tends to occur.

Preferably, the predetermined time point is the time point at which the slip of a wheel converges. As above, fluctuation of the rotation speed of the output shaft of the electric differential portion can suitably be suppressed for a time period after the convergence of the wheel slip during which relatively rapid torque variation of the output shaft of the power transmitting apparatus tends to occur.

Preferably, when the amount of divergence between the actual rotation speed of the engine and the target rotation speed of the engine at the time point at which the control is started, is equal to or more than a predetermined value, the target rotation speed of the engine is set. As above, the convergence of the number of the rotation is prevented from delaying.

BRIEF DESCRIPTION OF THE DRAWINGS

FIG. 1 is a diagram of essential portions for explaining the configuration of a power transmitting apparatus of a hybrid vehicle, that is an embodiment of the present invention.

FIG. 2 is an action chart for explaining combinations of actions of oil hydraulic frictional engaging apparatuses that are used for a gear shifting action of an automatic gear shifting portion included in the power transmitting apparatus of FIG. 1.

FIG. 11 is a chart of the correspondence relation between a time period elapsed from the time point at which gear shifting of the automatic gear shifting portion comes to an end and an amount of diverging rotation speed reduced of the engine rotation speed, concerning the control of FIG. 10.

FIG. 12 is a flowchart of an example of control of the engine rotation speed by the electronic control apparatus that corresponds to the timing chart of FIG. 10.

EXPLANATIONS OF LETTERS OR NUMERALS

Figure 3:
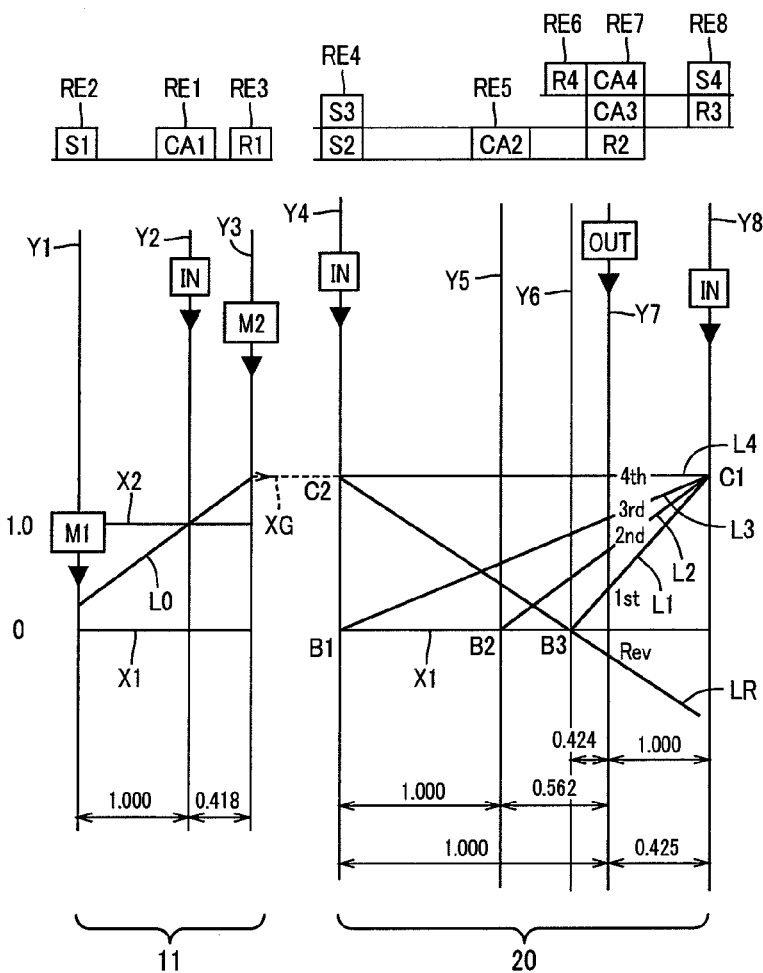
FIG. 3 is an alignment chart for explaining a relative rotation speed of each gear level in the power transmitting apparatus of FIG. 1.

8: engine 10: power transmitting apparatus for a vehicle 11: differential portion (electric differential portion) 20: automatic gear shifting portion (mechanical gear shifting portion) 34: driving wheels M1: first electric motor M2: second electric motor

BRIEF DESCRIPTION OF THE INVENTION

Embodiments of the present invention will be described in detail with reference to the accompanying drawings.
Embodiments FIG. 1 is a diagram of essential portions for explaining the configuration of a power transmitting apparatus 10 for a hybrid vehicle, that is suitably applied with the present invention. As depicted in FIG. 1, the power transmitting apparatus 10 of a present embodiment includes in series such components that are disposed on a common shaft center in a transmission case 12 (hereinafter, "case 12") as a non-rotating member fitted to a car body as: an input shaft 14 as an input rotating member; a differential portion 11 that is coupled directly to the input shaft 14 or indirectly thereto through a pulsation absorbing damper (vibration damping apparatus), etc., not depicted; an automatic gear shifting portion 20 that is coupled in series through a transmitting member (drive transmitting shaft) 18 in a power transmission path between the differential portion 11 and driving wheels 34 (see FIG. 7); and an output shaft 22 as an output rotating member that is coupled to the automatic gear shifting portion 20.

The power transmitting apparatus 10 of the embodiment: is, for example, a power transmitting apparatus that is mounted fore-and-aft in a vehicle and that is suitably used in an FR (Front-engine Rear-driving) vehicle; is provided in the power transmission path between an engine 8 that is an internal combustion engine such as, for example, a gasoline engine or a diesel engine as a driving force source for running coupled directly to the input shaft 14 or directly thereto through a pulsation absorbing damper not depicted, and the pair of driving wheels 34; and transmits power from the engine 8 to the pair of driving wheels 34 sequentially through a differential gear apparatus (final reduction gear) 32 (see FIG. 7), a pair of axle shafts, etc. The engine 8 and the differential portion 11 are directly coupled to each other in the power transmitting apparatus 10 of the embodiment. This "directly coupled" means being coupled through no fluidic transmitting apparatus such as a torque converter or fluid coupling and, for example, the coupling through the pulsation absorbing damper, etc., is included in this direct coupling. The power transmitting apparatus 10 is symmetrically configured with respect to the shaft center thereof and, therefore, the lower portion thereof is not depicted in the diagram of essential portions of FIG. 1. The same is applied to the following embodiments.

The differential portion 11 includes: a first electric motor M1; a power distributing mechanism 16 that is a mechanical mechanism mechanically distributing the output of the engine 8 input into the input shaft 14 and that acts as a differential mechanism distributing the output of the engine 8 to the first electric motor M1 and a transmitting member 18; and a second electric motor M2 that is operatively coupled to the transmitting member 18 to be integrally rotated with the transmitting portion 18. Both of the first and the second electric motors M1 and M2 included in the power transmitting apparatus 10 of another embodiment are so-called motor-generators that function as motors and power generators. However, the first electric motor M1 has at least a generator (power generating) function to generate a counterforce and the second electric motor M2 has at least a motor (electric motor) function to output a driving force as a driving power source for running. With such a configuration, the differential portion 11 functions as an electric differential portion whose differential state between its input rotation speed (the rotation speed of the input shaft 14) and its output rotation speed (the rotation speed of the transmitting member 18) is controlled by controlling the driving state through the first and the second electric motors M1 and M2.

The power distributing mechanism 16 is configured mainly by a single-pinion type first planetary gear apparatus 24 that has a predetermined gear ratio ρ1 of, for example, about "0.418". The first planetary gear apparatus 24 includes as its rotating elements (elements) a first sun gear S1, a first planetary gear P1, a first carrier CA1 that supports the first planetary gear P1 enabling the first planetary gear P1 to rotate and revolve, and a first ring gear R1 that engages with the first sun gear S1 through the first planetary gear P1. Representing the number of teeth of the first sun gear S1 as "ZS1" and the number of teeth of the first ring gear R1 as "ZR1", the gear ratio ρ1 is ZS1/ZR1.

In the power distributing mechanism 16: the first carrier CA1 is coupled to the input shaft 14, that is, the engine 8; the first sun gear S1 is coupled to the first electric motor M1; and the first ring gear R1 is coupled to the transmitting member 18. The first sun gear S1, the first carrier CA1, and the first ring gear R1 that are the three elements of the first planetary gear apparatus 24 are enabled to relatively rotate with each other respectively and, thereby, the differential action of the power distributing mechanism 16 configured as above is enabled, that is, the power distributing mechanism 16 is brought in a differential state where its differential action works. Therefore, the output of the engine 8 is distributed to the first electric motor M1 and the transmitting member 18, and the portion of the output of the engine 8 distributed generates electric energy from the first electric motor M1. This electric energy is charged or drives the second electric motor M2 to rotate. Therefore, the differential portion 11 (power distributing mechanism 16) is caused to function as an electric differential apparatus and is brought in, for example, a so-called continuously variable transmission state (electric CVT state). Therefore, the rotation of the transmitting member 18 is continuously varied regardless of the predetermined rotation of the engine 8. The differential portion 11 functions as an electric continuously variable transmission whose transmission gear ratio $\gamma 0$ (the rotation speed $N_{IN}$ of the input shaft 14/the rotation speed $N_{18}$ of the transmitting member 18) can continuously be varied from its minimal value $\gamma 0_{min}$ to its maximal value $\gamma 0_{max}$. In this manner, the power distributing mechanism 16 is caused to act as a continuously variable transmitting mechanism whose differential state between the rotation speed of the input shaft 14 and the rotation speed of the transmitting member 18 that functions as an output shaft of the differential portion 11 is controlled by controlling the driving state of each of the first and the second electric motors M1 and M2, and the engine 8 that are power-transmissibly coupled to the power distributing mechanism 16 (differential portion 11).

The automatic gear shifting portion 20: includes, in the power transmission path from the differential portion 11 to the driving wheels 34, a single-pinion type second planetary gear apparatus 26, a single-pinion type third planetary gear apparatus 28, and a single-pinion type fourth planetary gear apparatus 30; and is a planetary-gear-type multiple-speed transmission that functions as a multiple-speed automatic gear shifting apparatus. The second planetary gear apparatus 26: includes a second sun gear S2, a second planetary gear P2, a second carrier CA2 that supports the second planetary gear P2 enabling the second planetary gear P2 to rotate and revolve, and a second ring gear R2 that engages with the second sun gear S2 through the second planetary gear P2; and has a predetermined gear ratio ρ2 of, for example, about "0.562". The third planetary gear apparatus 28: includes a third sun gear S3, a third planetary gear P3, a third carrier CA3 that supports the third planetary gear P3 enabling the third planetary gear P3 to rotate and revolve, and a third ring gear R3 that engages with the third sun gear S3 through the third planetary gear P3; and has a predetermined gear ratio ρ3 of, for example, about "0.425". The fourth planetary gear apparatus 30: includes a fourth sun gear S4, a fourth planetary gear P4, a fourth carrier CA4 that supports the fourth planetary gear P4 enabling the fourth planetary gear P4 to rotate and revolve, and a fourth ring gear R4 that engages with the fourth sun gear S4 through the fourth planetary gear P4; and has a predetermined gear ratio ρ4 of, for example, about "0.421". Representing the number of teeth of the second sun gear S2 as "ZS2"; the number of teeth of the second ring gear R2 as "ZR2"; the number of teeth of the third sun gear S3 as "ZS3"; the number of teeth of the third ring gear R3 as "ZR3"; the number of teeth of the fourth sun gear S4 as "ZS4"; and the number of teeth of the fourth ring gear R4 as "ZR4", the gear ratio ρ2 is ZS2/ZR2, the gear ratio ρ3 is ZS3/ZR3, and the gear ratio ρ4 is ZS4/ZR4.

In the automatic gear shifting portion 20, the second sun gear S2 and the third sun gear S3 are integrally coupled to each other, are selectively coupled to the transmitting member 18 through a second clutch C2, and are also selectively coupled to the case 12 through a first brake B1. The second carrier CA2 is selectively coupled to the case 12 through a second brake B2. The fourth ring gear R4 is selectively coupled to the case 12 through a third brake B3. The second ring gear R2, the third carrier CA3, and the fourth carrier CA4 are integrally coupled to each other and are coupled to the output shaft 22. The third ring gear R3 and the fourth sun gear S4 are integrally coupled to each other and are selectively coupled to the transmitting member 18 through a first clutch C1.

In this manner, the inside of the automatic gear shifting portion 20 and the differential portion 11 (transmitting member 18) are selectively coupled to each other through the first or the second clutch C1 or C2 that is used to establish each speed level of the automatic gear shifting portion 20. In other words, the first and the second clutches C1 and C2 function as engaging apparatuses that selectively switch the state of the power transmission path between the transmitting member 18 and the automatic gear shifting portion 20, that is, the power transmission path from the differential portion 11 (transmitting member 18) to the driving wheels 34, between its power-transmissible state that enables the transmission of the power in the power transmission path and its power-transmission blocked state that causes the transmission of the power in the power transmission path to be blocked. At least one of the first and the second clutches C1 and C2 is(are) engaged and, thereby, the power transmission path is brought into its power-transmissible state, or the first and the second clutches C1 and C2 are released and, thereby, the power transmission path is brought into its power-transmission blocked state, that is, its neutral state.

In the automatic gear shifting portion 20, clutch-to-clutch gear shifting is executed by releasing of a releasing-side engaging apparatus and engaging of an engaging-side engaging apparatus, thereby, each gear level (transmission level) is selectively established, and, thereby, a transmission gear ratio γ (=the rotation speed $N_{18}$ of the transmitting member 18/the rotation speed $N_{OUT}$ of the output shaft 22) varying in a substantially geometric progression manner is acquired for each of the gear levels. For example, as presented in an engagement action table of FIG. 2, a first speed gear level is established whose transmission gear ratio γ1 takes, for example, about "3.357" as its maximal value by engagement of the first clutch C1 and the third brake B3. A second speed gear level is established whose transmission gear ratio γ2 takes, for example, about "2.180" that is smaller than that of the first speed gear level by engagement of the first clutch C1 and the second brake B2. A third speed gear level is established whose transmission gear ratio γ3 takes, for example, about "1.424" that is smaller than that of the second speed gear level by engagement of the first clutch C1 and the first brake B1. A fourth speed gear level is established whose transmission gear ratio γ4 takes, for example, about "1.000" that is smaller than that of the third speed gear level by engagement of the first clutch C1 and the second clutch C2. A reverse gear level (reverse transmission level) is established whose transmission gear ratio γR takes, for example, about "3.209" that is between those of the first and the second speed gear levels by engagement of the second clutch C2 and the third brake B3. A neutral "N" state is established by a release of each of the first and the second clutches C1 and C2, and the first, the second, and the third brakes B1, B2, and B3.

The first and the second clutches C1 and C2, and the first, the second, and the third brakes B1, B2, and B3 (hereinafter, "clutch C" and "brake B" without specifically distinguishing each one): each are an oil hydraulic frictional engaging apparatus as an engaging element that is often used in the conventional automatic gear shifting apparatus for a vehicle; each are configured by, for example, a multiple wet clutch whose plurality of brake linings mutually stacked are pressed by an oil hydraulic actuator, a band brake whose oil hydraulic actuator tightly pulls an end of each of one or two band(s) wound on the outer circumferential surface of a rotating drum, etc.; and each are a portion to selectively couple the members adjacent thereto on both sides with each other between which the portion is inserted.

The power transmitting apparatus 10 of the embodiment that is configured as above is configured as a continuously variable transmission as a whole by the differential portion 11 that functions as the continuously variable transmission and the automatic gear shifting portion 20 that is coupled to the differential portion 11. To configure the same state as that of a multiple-speed gear shifting apparatus using the differential portion 11 and the automatic gear shifting portion 20 is enabled by controlling the transmission gear ration of the differential portion 11 to be constant.

More specifically, the differential portion 11 functions as the continuously variable transmission and the automatic gear shifting portion 20 coupled in series to the differential portion 11 functions as the multiple-speed gear shifting apparatus and, thereby, the rotation speed input into the automatic gear shifting portion 20 for at least one gear level M of the automatic gear shifting portion 20 (hereinafter, "input rotation speed of the automatic gear shifting portion 20"), that is, the rotation speed of the transmitting member 18 (hereinafter, "transmitting member rotation speed $N_{18}$") is continuously varied and, therefore, a continuous transmission gear ratio width is acquired at the gear level M. Therefore, a total transmission gear ratio γT (=the rotation speed $N_{IN}$ of the input shaft 14/the rotation speed $N_{OUT}$ of the output shaft 22) of the power transmitting apparatus 10 is continuously acquired and, thereby, the power transmitting apparatus 10 is configured as the continuously variable transmission. The total transmission gear ratio γT of the power transmitting apparatus 10 is a total transmission gear ratio γT that is formed based on the transmission gear ratio γ0 of the differential portion 11 and the transmission gear ratio γ of the automatic gear shifting portion 20 and that is for the power transmitting apparatus 10 as a whole.

For example, the rotation speed $N_{18}$ of the transmitting member is continuously varied for each gear level of the first to the fourth gear levels and the reverse gear level of the automatic gear shifting portion 20 presented in the engagement action table of FIG. 2 and, thereby, the continuous transmission gear ratio width is acquired for each of the gear levels. Therefore, a transmission gear ratio that is continuously variable without any gear level is set between each adjacent two gear levels and, therefore, the total transmission gear ratio γT is continuously acquired for the power transmitting apparatus 10 as a whole.

The transmission gear ratio of the differential portion 11 is controlled to be constant and any one of the first to the fourth gear levels or the reverse gear level (reverse transmission level) is selectively established by selectively engaging and causing to act the clutch C and the brake B and, thereby, the total transmission gear ratio γT of the power transmitting apparatus 10 that varies in a substantially geometric progression manner is acquired for each gear level. Therefore, the same state as that of a multiple-speed gear shifting apparatus is configured in the power transmitting apparatus 10. For example, when the transmission gear ratio γ0 of the differential portion 11 is controlled to be fixed to be "1", as presented in the engagement action table of FIG. 2, for each gear level, the total transmission gear ratio γT of the power transmitting apparatus 10 is acquired that corresponds to each gear level of the first to the fourth gear levels and the reverse gear level of the automatic gear shifting portion 20. When the transmission gear ratio γ0 of the differential portion 11 is controlled to be fixed to be a value that is smaller than "1" that is, for example, about 0.7 at the fourth gear level of the automatic gear shifting portion 20, the total transmission gear ratio γT is acquired that is smaller than that of the fourth gear level and that is, for example, about "0.7".

FIG. 3 is an alignment chart that can depict on a straight line the relative relations among the rotation speeds of the rotating elements whose coupling state differs for each gear level in the power transmitting apparatus 10 that is configured by the differential portion 11 and the automatic gear shifting portion 20. The alignment chart of FIG. 3 is based on a two-dimensional coordinate system configured by the axis of abscissa that represents the relation among gear ratios p of the planetary gear apparatuses 24, 26, 28, and 30 and the axis of ordinate that represents the relative rotation speeds thereof. A lateral line X1 represents a rotation speed of zero. A lateral line X2 represents a rotation speed "1.0", that is, a rotation speed $N_E$ of the engine 8 that is coupled to the input shaft 14. A lateral line XG represents the rotation speed $N_{18}$ of the transmitting member 18.

Three longitudinal lines Y1, Y2, and Y3 correspond to three elements of the power distributing mechanism 16 that configures the differential portion 11, and sequentially represent from the left the relative rotation speeds of the first sun gear S1 corresponding to a second rotating element (second element) RE2, the first carrier CA1 corresponding to a first rotating element (first element) RE1, and the first ring gear R1 corresponding to a third rotating element (third element) RE3. The intervals thereamong are determined corresponding to the gear ratio ρ1 of the first planetary gear apparatus 24. As to five longitudinal lines Y4, Y5, Y6, Y7, and Y8 of the automatic gear shifting portion 20, sequentially from the left: Y4 represents the relative rotation speeds of the second and the third sun gears S2 and S3 that correspond to a fourth rotating element (fourth element) RE4 and that are coupled to each other; Y5 represents the relative rotation speed of the second carrier CA2 that corresponds to a fifth rotating element (fifth element) RE5; Y6 represents the relative rotation speed of the fourth ring gear R4 that corresponds to a sixth rotating element (sixth element) RE6; Y7 represents the relative rotation speeds of the second ring gear R2, and the third and the fourth carriers CA3 and CA4 that correspond to a seventh rotating element (seventh element) RE7 and that are coupled to each other; and Y8 represents the relative rotation speeds of the third ring gear R3 and the fourth sun gears S4 that correspond to an eighth rotating element (eighth element) RE8 and that are coupled to each other. The intervals thereamong are determined corresponding to the gear ratios ρ2, ρ3, and ρ4 of the second, the third, and the fourth planetary gear apparatuses 26, 28, and 30. Assuming that an interval between a sun gear and a carrier is an interval that corresponds to "1" in the relation among the longitudinal lines of the alignment chart, an interval between a carrier and a ring gear is an interval that corresponds to the gear ratio ρ of a planetary gear apparatus. For the differential portion 11, the longitudinal-line interval between the longitudinal lines Y1 and Y2 is set to be an interval that corresponds to "1" and the interval between the longitudinal lines Y2 and Y3 is set to be an interval that corresponds to the gear ratio ρ1. For the automatic gear shifting portion 20, an interval between a sun gear and a carrier is set to be an interval that corresponds to "1" for each of the second, the third, and the fourth planetary gear apparatuses 26, 28, and 30 and an interval between a carrier and a ring gear is set to be an interval that corresponds to ρ.

Describing the above using the alignment chart of FIG. 3, in the power transmitting apparatus 10 of the embodiment, the power distributing mechanism 16 (differential portion 11) is adapted such that: the first rotating element RE1 (first carrier CA1) of the first planetary gear apparatus 24 is coupled to the input shaft 14, that is, the engine 8; the second rotating element RE2 is coupled to the first electric motor M1; the third rotating element (first ring gear R1) RE3 is coupled to the transmitting member 18 and the second electric motor M2; and the rotation of the input shaft 14 is transmitted to (input into) the automatic gear shifting portion 20 through the transmitting member 18. With this configuration, the relation between the rotation speed of the first sun gear S1 and the rotation speed of the first ring gear R1 is represented by an oblique straight line L0 that passes through an intersection of Y2 and X2.

For example, in the differential portion 11, the first to the third rotating elements RE1 to RE3 are brought into their differential state where these elements RE1 to RE3 can relatively be mutually rotated. In the case where the rotation speed of the first ring gear R1 represented by an intersection of the straight line L0 and the longitudinal line Y3 is constrained by a vehicle speed V and, therefore, substantially is constant, when the rotation speed of the first carrier CA1 represented by an intersection of the straight line L0 and the longitudinal line Y2 is increased or decreased by controlling the engine rotation speed $N_E$, the rotation speed of the first sun gear S1 represented by an intersection of the straight line L0 and the longitudinal line Y1, that is, the rotation speed of the first electric motor M1 is increased or decreased.

When the rotation of the first sun gear S1 is set to be the same rotation as that of the engine rotation speed $N_E$ by controlling the rotation speed of the first electric motor M1 such that the transmission gear ratio γ0 of the differential portion 11 is fixed to be "1", the straight line L0 is caused to coincide with the lateral line X2 and the first ring gear R1, that is, the transmitting member 18 is rotated in the same rotation as that of the engine rotation speed $N_E$. Otherwise, when the rotation of the first sun gear S1 is set to be zero by controlling the rotation speed of the first electric motor M1 such that the transmission gear ratio γ0 of the differential portion 11 is fixed to be a value that is smaller than "1" and that is, for example, about 0.7, the transmitting member rotation speed $N_{18}$ is rotated in the rotation whose speed is increased to be higher than the engine rotation speed $N_E$.

In the automatic gear shifting portion 20: the fourth rotating element RE4 is selectively coupled to the transmitting member 18 through the second clutch C2 and is also selectively coupled to the case 12 through the first brake B1; the fifth rotating element RE5 is selectively coupled to the case 12 through the second brake B2; the sixth rotating element RE6 is selectively coupled to the case 12 through the third brake B3; the seventh rotating element RE7 is coupled to the output shaft 22; and the eighth rotating element RE8 is selectively coupled to the transmitting member 18 through the first clutch C1.

In the automatic gear shifting portion 20, when the rotation of the transmitting member 18 (third rotating element RE3) that is an output rotating member in the differential portion 11 is input into the eighth rotating element RE8 due to engagement of the first clutch C1, the first clutch C1 and the third brake B3 are engaged with each other as depicted in FIG. 3. Thereby, the rotation speed of the output shaft 22 at a first speed (1st) is represented by an intersection of: an oblique straight line L1 that passes through an intersection of the longitudinal line Y8 that represents the rotation speed of the eighth rotating element RE8 and the lateral line XG, and an intersection of the longitudinal line Y6 that represents the rotation speed of the sixth rotating element RE6 and the lateral line X1; and the longitudinal line Y7 that represents the rotation speed of the seventh rotating element RE7 coupled to the output shaft 22. Similarly, the rotation speed of the output shaft 22 at a second speed (2nd) is represented by an intersection of an oblique straight line L2 that is determined by engaging the first clutch C1 and the second brake B2 with each other, and the longitudinal line Y7 that represents the rotation speed of the seventh rotating element RE7 coupled to the output shaft 22. The rotation speed of the output shaft 22 at a third speed (3rd) is represented by an intersection of an oblique straight line L3 that is determined by engaging the first clutch C1 and the first brake B1 with each other, and the longitudinal line Y7 that represents the rotation speed of the seventh rotating element RE7 coupled to the output shaft 22. The rotation speed of the output shaft 22 at a fourth speed (4th) is represented by an intersection of a horizontal straight line L4 that is determined by engaging the first and the second clutches C1 and C2 with each other, and the longitudinal line Y7 that represents the rotation speed of the seventh rotating element RE7 coupled to the output shaft 22.

Figure 4:
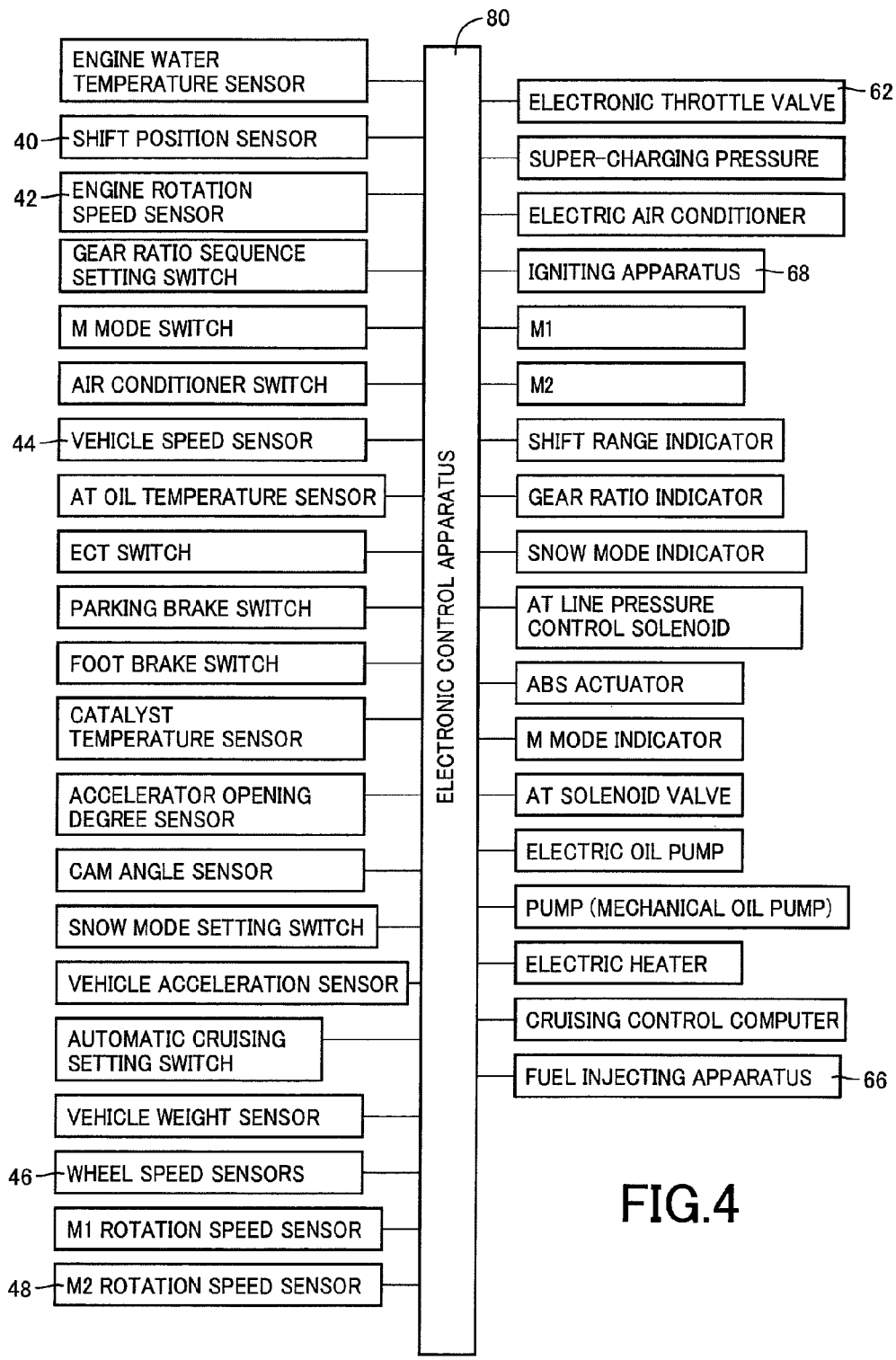
FIG. 4 is a diagram for explaining input and output signals of an electronic control apparatus included in the power transmitting apparatus of FIG. 1.

FIG. 4 exemplifies signals that are input into an electronic control apparatus 80 to control the power transmitting apparatus 10 of the embodiment and signals that are output from the electronic control apparatus 80. The electronic control apparatus 80: includes a so-called micro computer that is configured by a CPU, a ROM, a RAM, an input/output interface, etc.; and executes signal processing according to a program stored in advance in the ROM using a temporary storage function of the RAM and, thereby, executes the various kinds of control such as the control of the hybrid driving concerning the engine 8 and the first and the second electric motors M1 and M2, and the control of the gear shifting of the automatic gear shifting portion 20.

The electronic control apparatus 80 is supplied with various signals from sensors, switches, etc., as depicted in FIG. 4. Signals are supplied such as: a signal indicating the engine water temperature $TEMP_W$ from an engine water temperature sensor; a signal indicating a shift position $P_{SH}$ of a shift lever 52 (see FIG. 6) and the number of operations at an "M" position thereof, etc., from a shift position sensor 40; a signal indicating the engine rotation speed $N_E$ that is the rotation speed of the engine 8 from an engine rotation speed sensor 42; a signal indicating a gear ratio sequence setting value from a gear ratio sequence setting switch; a signal ordering an M mode (manual gear-shifting running mode) from an M mode switch; a signal indicating an action of an air conditioner from an air conditioner switch; a signal indicating the vehicle speed V that corresponds to the rotation speed of the output shaft 22 (hereinafter, "output shaft rotation speed) $N_{OUT}$ from a vehicle speed sensor 44; a signal indicating the actuating hydraulic oil temperature $T_{OIL}$ of the automatic gear shifting portion 20 from an AT oil temperature sensor; a signal indicating an operation of a parking brake from a parking brake switch; a signal indicating an operation of a foot brake from a foot brake switch; a signal indicating the catalyst temperature from a catalyst temperature sensor; a signal indicating an accelerator opening degree $A_{CC}$ that is the amount of operation of an accelerator pedal corresponding to the amount of output demanded by a driver from an accelerator opening degree sensor; a signal indicating a cam angle from a cam angle sensor; a signal indicating a snow mode setting from a snow mode setting switch; a signal indicating forward or backward acceleration G of the vehicle from a vehicle acceleration sensor; a signal indicating automatic cruising running from an automatic cruising setting switch; a signal indicating the weight of the vehicle (vehicle weight) from a vehicle weight sensor; a signal indicating the speed of each of the wheels (a pair of front wheels and a pair of rear wheels on the right and the left) from wheel speed sensors 46; a signal indicating the rotation speed $N_{M1}$ of the first electric motor M1 from an M1 rotation speed sensor; a signal indicating the rotation speed $N_{M2}$ of the second electric motor M2 from an M2 rotation speed sensor 48; and a signal indicating a charged capacity (the state of electric charging) SOC of a battery apparatus 56 (see FIG. 7) from a battery sensor. The second electric motor M2 is provided integrally rotatably with the transmitting member 18 as an input member of the automatic gear shifting portion 20 and, therefore, the rotation speed of the second electric motor M2 detected by the M2 rotation speed sensor 48 corresponds to the rotation speed of the transmitting member 18, that is, the input rotation speed of the automatic gear shifting portion 20.

Such a signal is output from the electronic control apparatus 80 as a control signal to an engine output control apparatus 58 (see FIG. 7) that control the output of the engine as, for example: a driving signal to a throttle actuator 64 that operates the throttle valve opening degree $\theta_{TH}$ of an electronic throttle valve 62 disposed on an intake pipe 60 of the engine 8; a fuel supply amount signal that controls the amount of fuel supplied into the intake pipe 60 or cylinders of the engine 8 by a fuel injecting apparatus 66; or an ignition signal that orders ignition timings of the engine 8 by an igniting apparatus 68. Such signals are output as: a super-charging pressure adjustment signal to adjust a super-charging pressure; an electric air-conditioner driving signal to actuate an electric air-conditioner; an ordering signal that orders actions of the electric motors M1 and M2; a shift position (operation position) indicating signal to actuate a shift indicator; a gear ratio indication signal to indicate a gear ratio; a snow mode indication signal to indicate that the mode is a snow mode; an ABS operation signal to operate an ABS actuator that prevents slipping of wheels during braking; an M mode indication signal to indicate that the M mode is selected; a valve order signal to actuate an electromagnetic valve (linear solenoid valve) included in an oil hydraulic control circuit 70 (see FIGS. 5 and 7) to control an oil hydraulic actuator of an oil hydraulic frictional engaging apparatus included in the differential portion 11 and the automatic gear shifting portion 20; a signal to adjust the pressure of a line oil pressure $P_L$ using a regulator valve (pressure regulating valve) disposed on the oil hydraulic control circuit 70; a driving order signal to actuate an electric oil hydraulic pump that is an oil pressure source of a main pressure for the line oil pressure $P_L$ to be adjusted; and a signal to drive an electric heater; and a signal to a computer to control cruise control.

Figure 5:
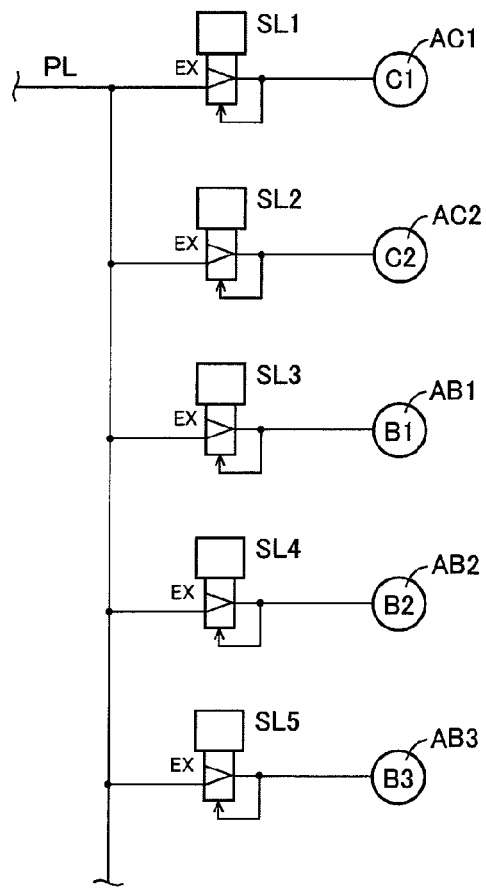
FIG. 5 is a circuit diagram concerning linear solenoid valves that control actions of oil hydraulic actuators of clutches and brakes of an oil hydraulic control apparatus.

FIG. 5 is a circuit diagram concerning linear solenoid valves SL1 to SL5 that control operations of oil hydraulic actuators (oil hydraulic cylinders) AC1, AC2, and AB1 to AB3 of the clutches C1 and C2 and the brakes B1 to B3 of the oil hydraulic control circuit 70. In FIG. 5, the oil hydraulic actuators AC1, AC2, and AB1 to AB3 are directly supplied with the line oil pressures $P_L$ after the line oil pressure is respectively adjusted therefor to engaging pressures PC1, PC2, and PB1 to PB3 according to order signals from the electronic control apparatus 80 by the linear solenoid valves SL1 to SL5 The line oil pressure $P_L$ is adjusted from an oil pressure, as the main pressure generated from an electric oil pump not depicted or a mechanical oil pump that is driven and rotated by the engine 8, by, for example, relief regulating valve (regulator valve) to a value that corresponds to an load on the engine, etc., that are expressed using the accelerator opening degree or the throttle opening degree. The linear solenoid valves SL1 to SL5 depicted in FIG. 5 all basically have the same configuration and are each independently set to be magnetically excited or unexcited by the electronic control apparatus 80. Thereby, the oil pressure of each of the oil hydraulic actuators AC1, AC2, and AB1 to AB3 is independently controlled to be adjusted. Thereby, the engagement pressures PC1, PC2, and PB1 to PB3 are controlled of the clutches C1 and C2 and the brakes B1 to B3. In the automatic gear shifting portion 20, each gear level is established by the engagement of the engaging apparatuses determined in advance as, for example, presented in the engagement action table of FIG. 2. In the transmission control of the automatic gear shifting portion 20, so-called clutch-to-clutch gear shifting is executed that simultaneously controls, for example, release and engagement of the clutch C and the brake B that are involved in the gear shifting.

Figure 6:
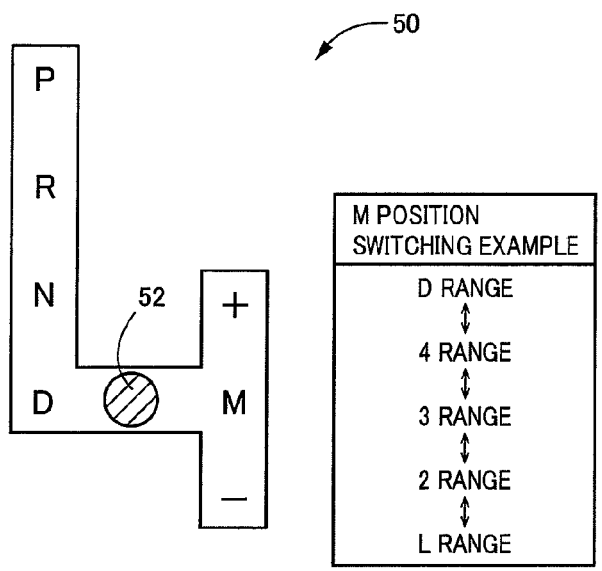
FIG. 6 depicts an example of a shift operating apparatus that includes a shift lever and that is operated to select plural kinds of shift positions.

FIG. 6 is a diagram of an example of a shift operating apparatus 50 as a switching apparatus that switches among plural kinds of shift positions $P_{SH}$ with manual operations. The shift operating apparatus 50 is disposed, for example, beside a driver's seat and includes a shift lever 52 to be operated to select the plural kinds of shift positions $P_{SH}$. The shift lever 52 is provided to be manually operated to set: a parking position "P (Parking)" to establish the neutral state, that is, a neutralized state where the power transmission path in the power transmitting apparatus 10, that is, the automatic gear shifting portion 20 is blocked, and to lock the output shaft 22 of the automatic gear shifting portion 20; a reverse running position "R (Reverse)" for reverse running; the neutral position "N (neutral)" to establish the neutral state where the power transmission path in the power transmitting apparatus 10 is blocked; a forward automatic gear shifting running position "D (Drive)" that causes an automatic gear shifting mode to be established and that causes automatic gear shifting control to be executed within a range for variation of the total transmission gear ratio γT with which the power transmitting apparatus 10 can vary the speed and that is acquired by the continuous transmission gear ratio width of the differential portion 11 and each of the gear levels that is automatically gear-shifted being controlled within the range of the first to the fourth gear levels of the automatic gear shifting portion 20; or a forward manual gear shifting running position "M (Manual)" to establish the manual gear shifting running mode (manual mode) and to set a so-called gear shifting range that limits the gear level on the high-speed side in the automatic gear shifting portion 20.

In the power transmitting apparatus 10, for example, the oil hydraulic control circuit 70 is electrically switched such that each gear level, etc., are established in each of the reverse gear level "R", a neutral state "N", and a forward gear level "D" presented in the engagement action table of FIG. 2 associated with the manual operation of the shift lever 52 to each of the shift positions $P_{SH}$. Of the shift positions $P_{SH}$ described as the above "P" to "M" positions, the "P" and the "N" positions are non-running positions that are selected when the vehicle is not caused to run, and are each a non-driving position to select switching to the power transmission blocked state of the power transmission path that is set by the first and the second clutches C1 and C2, that causes the vehicle to be unable to be driven, and that causes the power transmission path to be blocked in the automatic gear shifting portion 20 with, for example, both of the first and the second clutches C1 and C2 being released as presented in the engagement action table of FIG. 2. The "R", the "D", and the "M" positions are running positions that are selected when the vehicle is caused to run, and are each a driving position to select switching to the power transmissible state of the power transmission path, that is set by the first and/or the second clutche(s) C1 and/or C2, that causes the vehicle to be able to be driven, and that causes the power transmission path to be coupled in the automatic gear shifting portion 20 with, for example, at least one of the first and the second clutches C1 and C2 being engaged as presented in the engagement action table of FIG. 2.

More specifically, when the shift lever 52 is manually operated from the "P" or "N" position to the "R" position, the second clutch C2 is thereby engaged and the state of the power transmission path in the automatic gear shifting portion 20 is shifted from its power transmission blocked state to its power transmissible state. When the shift lever 52 is manually operated from the "N" position to the "D" position, at least the first clutch C1 is thereby engaged and the state of the power transmission path in the automatic gear shifting portion 20 is shifted from its power transmission blocked state to its power transmissible state. When the shift lever 52 is manually operated from the "R" position to the "P" or "N" position, the second clutch C2 is thereby released and the state of the power transmission path in the automatic gear shifting portion 20 is shifted from its power transmissible state to its power transmission blocked state. When the shift lever 52 is manually operated from the "D" position to the "N" position, the first and the second clutches C1 and C2 are thereby released and the state of the power transmission path in the automatic gear shifting portion 20 is shifted from its power transmissible state to its power transmission blocked state.

Figure 7:
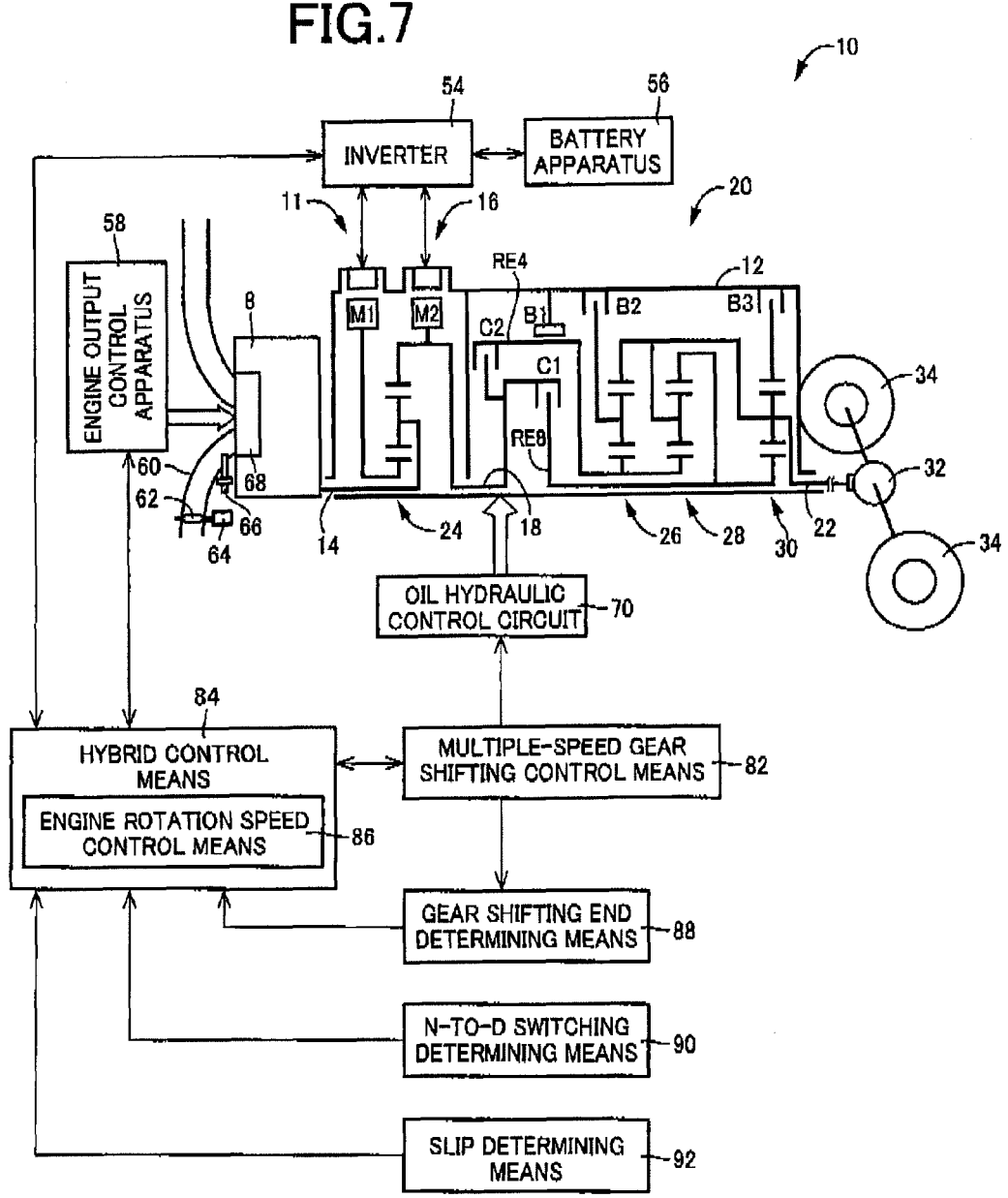
FIG. 7 is a functional block line diagram for explaining the main point of a control function retained in the electronic control apparatus of FIG. 4.
Figure 8:
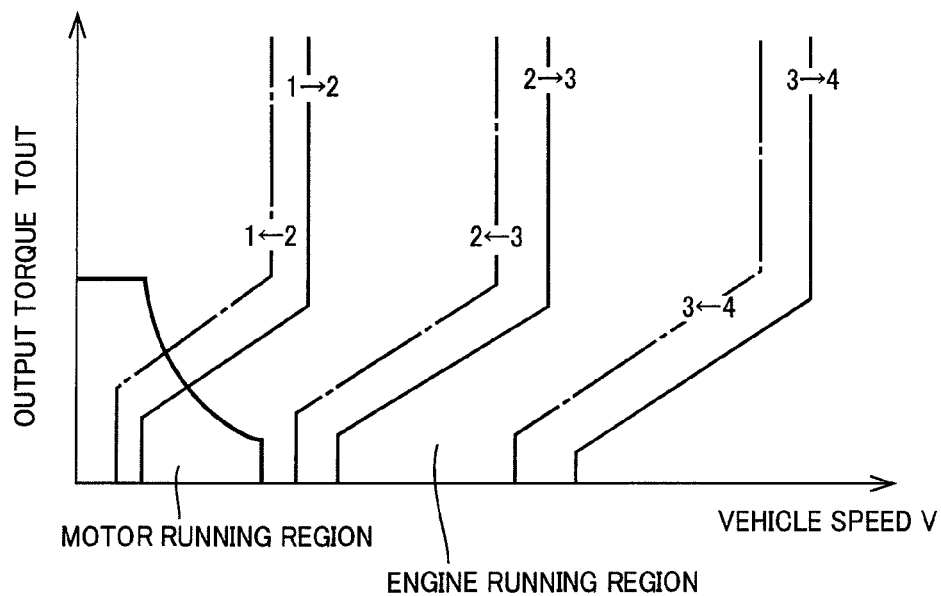
FIG. 8 is a diagram of an example of a gear shifting map that is used in control of gear shifting of the power transmitting apparatus of FIG. 1 and an example of a driving force source map that is used in control of driving force source switching to switch between engine running and motor running, and is also a diagram of the relation of the maps.

FIG. 7 is a functional block line diagram for explaining the main point of control functions that are included in the electronic control apparatus 80. A multiple-speed gear shifting control means 82 depicted in FIG. 7 determines whether gear shifting of the automatic gear shifting portion 20 is executed (that is, determines which gear level is to be shifted to) based on the state of the vehicle represented by the actual vehicle speed V and a required output torque $T_{OUT}$ of the automatic gear shifting portion 20, from the relation (a gear shifting line diagram, a gear shifting map) including an upward shift line (a solid line) and a downward shift line (a dot and dash line) stored in advance using the vehicle speed V and the output torque $T_{OUT}$ of the automatic gear shifting portion 20 as their variables, as depicted in FIG. 8, and the multiple-speed gear shifting control means 82 executes its automatic gear shifting control for the automatic gear shifting portion 20 to acquire the gear level determined.

In the above control, the multiple-speed gear shifting control means 82 outputs to the oil hydraulic control circuit 70 an order to cause the oil hydraulic frictional engaging apparatuses involved in the gear shifting of the automatic gear shifting portion 20 to be engaged and/or released (a gear shifting output order, an oil hydraulic order), that is, an order to cause the clutch-to-clutch gear shifting to be executed by releasing the releasing-side engaging apparatuses and engaging the engaging-side engaging apparatuses involved in the gear shifting of the automatic gear shifting portion 20 such that a gear level is achieved according to, for example, the engagement action table of FIG. 2. In the oil hydraulic control circuit 70, according to the order, the output pressure of the linear solenoid valve SL is controlled and, thereby, control, etc., of the pressure of the oil supplied to the corresponding oil hydraulic actuators are executed. Thereby, the leasing-side engaging apparatuses are released and the engaging-side engaging apparatuses are engaged and, thereby, the gear shifting of the automatic gear shifting portion 20 is executed.

A hybrid control means 84 depicted in FIG. 7 controls driving of each of the engine 8, and the first and the second electric motors M1 and M2 and, thereby, realizes control of hybrid driving by the power transmitting apparatus 10. To execute this control, the hybrid control means 84 includes an engine rotation speed control means 86 that controls the rotation speed $N_E$ of the engine 8 through the engine output control apparatus 58.

For example, the hybrid control means 84 causes the engine 8 to operate in an operation range for its efficient operation and, on the other hand, controls the transmission gear ratio γ0 of the differential portion 11 as an electric continuously variable transmission by varying the distribution of the driving forces of the engine 8 and the second electric motor M2, and the counterforce caused by the power generation of the first electric motor M1 to be optimal. For example: at a vehicle running speed V at a time point, a target (required) output of the vehicle is calculated from an accelerator opening degree $A_{CC}$ as the amount of the output required by the driver and the vehicle speed V; the total target output necessary is calculated from the target output and a required charge value of the vehicle; and the target engine output is calculated taking into consideration the transmission loss, the auxiliary machinery load, an assisting torque of the second electric motor M2, etc., such that the total target output is acquired. The engine 8 is controlled to have the engine rotation speed $N_E$ and the engine torque $T_E$ with which the target engine output is acquired, and the amount of power generated by the first electric motor M1 is controlled.

The hybrid control means 84 executes its control for improving the power performance, fuel consumption efficiency, etc., taking into consideration the gear levels of the automatic gear shifting portion 20. In this hybrid control, the differential portion 11 is caused to function as the electric continuously variable transmission to match the engine rotation speed $N_E$ that is determined to operate the engine 8 in the operation range for its efficient operation, with the rotation speed of the transmitting member 18 that is determined based on the vehicle speed V and the gear level of the automatic gear shifting portion 20. The hybrid control means 84: determines the target value of the total transmission gear ratio γT of the power transmitting apparatus 10 to acquire the engine torque $T_E$ and the engine rotation speed $N_E$ to generate the engine output that is necessary for satisfying, for example, the target output (the total target output, the required driving force) such that the engine 8 is caused to operate along the optimal fuel consumption rate curve of the engine 8 (the fuel consumption map, the relation) as represented by the dotted line of FIG. 9 that is experimentally acquired and stored in advance to simultaneously establish the drivability and efficient fuel consumption when the vehicle runs using the continuous variable transmission on the two-dimensional coordinate system configured by the engine rotation speed $N_E$ and the output torque (engine torque) $T_E$ of the engine 8; controls the transmission gear ratio γ0 of the differential portion 11 taking into consideration the gear level of the automatic gear shifting portion 20 such that the target value is acquired; and controls the total transmission gear ratio yT in its variation range within which the gear shifting is available.

For the above control, the hybrid control means 84 supplies the electric energy generated by the first electric motor M1 to the battery apparatus 56 and the second electric motor M2 through an inverter 54 (see FIG. 7). Thereby, the main portion of the power of the engine 8 is mechanically transmitted to the transmitting member 18 and, on the other hand, a portion of the power is consumed for the power generation by the first electric motor M1 and is converted into electric energy. This electric energy is supplied to the second electric motor M2 through the inverter 54. This electric energy drives the second electric motor M2 and is transmitted from the second electric motor M2 to the transmitting member 18. By the apparatuses concerning this electric energy from its generation to its consumption by the second electric motor M2, an electric path is configured that spans from the conversion of the portion of the power of the engine 8 into the electric energy to the conversion of this electric energy into the mechanical energy.

Regardless of whether the vehicle is stopped or running, the hybrid control means 84 controls the rotation speed(s) $N_{M1}$ and/or $N_{M2}$ of the first and/or the second electric motor(s) M1 and/or M2 using the electric CVT function of the differential portion 11 and, thereby, maintains the engine rotation speed $N_E$ to be substantially constant or controls the rotation speed(s) to be at an arbitrary rotation speed(s). In other words, the hybrid control means 84 can maintain the engine rotation speed $N_E$ to be substantially constant or control the engine rotation speed $N_E$ to be at an arbitrary rotation speed and, simultaneously, can control as to the rotation(s) the rotation speed(s) $N_{M1}$ and/or $N_{M2}$ of the first and/or the second electric motor(s) M1 and/or M2 to be the arbitrary rotation speed(s).

For example, as can be seen from the alignment chart of FIG. 3, in the case where the engine rotation speed $N_E$ is increased when the vehicle is running, the hybrid control means 84 maintains the rotation speed $N_{M2}$ of the second electric motor M2 that is constrained by the vehicle speed V (the rotation speed of the driving wheels 34) to be substantially constant and, simultaneously, executes the increase of the rotation speed $N_{M1}$ of the first electric motor M1. When the hybrid control means 84 maintains the engine rotation speed $N_E$ to be substantially constant during the gear shifting of the automatic gear shifting portion 20, the hybrid control means 84 maintains the engine rotation speed $N_E$ to be substantially constant and, simultaneously, varies the rotation speed $N_{M1}$ of the first electric motor M1 in a direction opposite to that of the variation of the rotation speed $N_{M2}$ of the second electric motor M2 associated with the gear shifting of the automatic gear shifting portion 20.

The engine rotation speed control means 86 included in the hybrid control means 84 controls the output of the engine 8 and the engine rotation speed $N_E$ as a result by outputting orders to be issued to the throttle actuator 64, the fuel injecting apparatus 66, and the igniting apparatus 68 each independently or in combination with each other, to the engine output control apparatus 58: to cause the throttle actuator 64 to control the electronic throttle valve 62 to open or close for controlling the throttle; to cause the fuel injecting apparatus 66 to control the amount of fuel injected and the timing of the injection for controlling the fuel injection; and to cause the igniting apparatus 68 such as an igniter to control the ignition timing for controlling the ignition timing.

For example, basically, the engine rotation speed control means 86: calculates the target rotation speed $N_{ELINE}$ of the engine 8 based on the accelerator opening degree $A_{CC}$, the vehicle speed V, etc., from the relation stored in advance and not depicted; and controls the rotation speed (driving) of the engine 8 such that the actual rotation speed $N_E$ of the engine 8 becomes equal to the target rotation speed $N_{ELINE}$. This setting of the engine target rotation speed $N_{ELINE}$ is executed during driving of, during load-driving of, or during control of the rotation speed of the engine 8. The engine output control apparatus 58 executes the control of the engine rotation speed (control of the engine output) by controlling the fuel injection by the fuel injecting apparatus 66 for controlling the fuel injection, by controlling the timing of the ignition by the igniting apparatus 68 such as an igniter for controlling the ignition timing, etc., in addition to controlling the opening and closing of the electronic throttle valve 62 by the throttle actuator 64 for controlling the throttle, based on the target rotation speed $N_{ELINE}$ calculated by the engine rotation speed control means 86 (that is, according to an order that corresponds to the target rotation speed $N_{ELINE}$).

Figure 9:
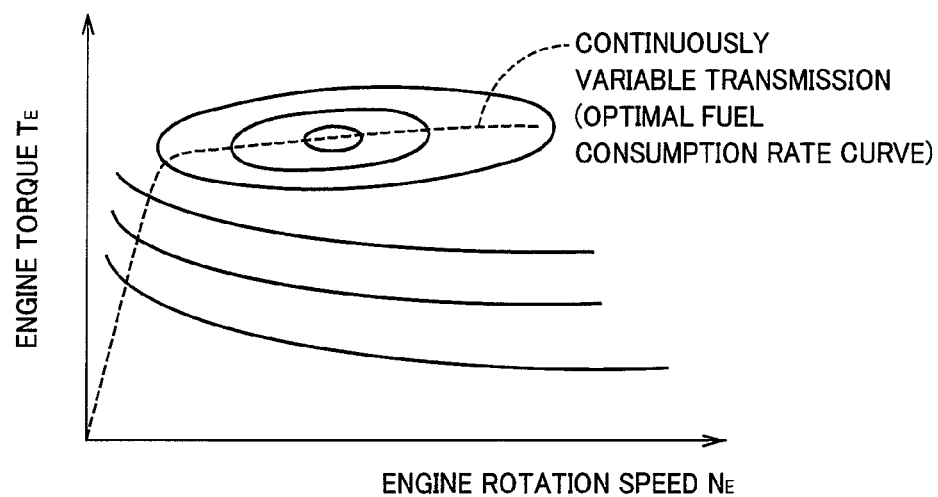
FIG. 9 is a diagram of the relation between the engine rotation speed and the engine torque, that is used in control of the engine output in the power transmitting apparatus of FIG. 1 and a dotted line is an optimal fuel consumption rate curve of the engine and is an example of a fuel consumption map.

Basically, the engine rotation speed control means 86 controls the rotation speed $N_E$ of the engine 8 to cause the rotation speed $N_E$ of the engine 8 to become equal to the target rotation speed $N_{ELINE}$ that is calculated in advance corresponding to the actual accelerator opening degree $A_{cc}$, etc., based on the relation as depicted in FIG. 9 determined in advance such that the rotation speed $N_E$ coincides with the operation point that is on a power curve and on the optimal fuel consumption efficiency curve by coping with the required engine output (power) to acquire the required driving force, etc., according to, for example, a feedback control equation (C1) presented as follows. The rotation speed of the engine 8 is controlled by feeding back such that an amount of divergence "e" between the actual rotation speed $N_E$ and the target rotation speed $N_{ELINE}$ of the engine 8 converges. When a request for an increase of the speed is determined based on the fact that the accelerator pedal not depicted is stepped on, etc.: the target rotation speed $N_{ELINE}$ for increasing the speed is set during the transient time period during which the actual rotation speed $N_E$ asymptotically approaches the target rotation speed $N_{ELINE}$ that is rapidly increased corresponding to the accelerator opening degree $A_{cc}$ that is also rapidly increased; the amount of divergence e ($=N_{ENE}-N_E$) is calculated between the target rotation speed $N_{ELINE}$ for increasing the speed and the actual engine rotation speed $N_E$; and a gain is temporarily increased of the control by feeding back until the amount of divergence e becomes within a predetermined value range M. In the equation presented as follow (C1): the left-hand side "$N_E$" is the engine rotation speed (the amount to be controlled) in this case; the first term "$N_{E0}$" on the right-hand side is the engine rotation speed (the amount to be controlled) in the previous control cycle; the second term "$\Delta N_E$" on the right-hand side is an amount by which the control amount is varied; "$C_p$" is a proportionality constant (gain); and "$C_i$" is an integration constant (gain).

$$N_E = N_{E0} + \Delta N_E \quad (C1)$$

In the above, $\Delta N_E = C_p \times e + C_i \times \int e \, dt$

Regardless of the stoppage or idling of the engine 8, the hybrid control means 84 can cause the vehicle to be run by the electric motor, by using the electric CVT function (differential action) of the differential portion 11. The running by the electric motor is executed in, for example, a relatively-low output torque $T_{OUT}$ region, that is, a low engine torque $T_E$ region within which the engine efficiency is generally considered to be degraded compared to that of a high torque region, or in a relatively-low vehicle speed region of the vehicle speed V, that is, a low load region. During the running by the electric motor, to suppress drag by the engine 8 that is stopped and, thereby, improve the fuel consumption efficiency, the rotation speed $N_{M1}$ of the first electric motor M1 is controlled to be a negative rotation speed, and the first electric motor M1 is brought into, for example, a non-load state and, thereby, is rotated in idling. Thereby, the engine rotation speed $N_E$ is maintained at zero to substantially zero when necessary, by the electric CVT function (differential action) of the differential portion 11.

Even in the engine running region, the hybrid control means 84 supplies to the second electric motor M2 the electric energy from the first electric motor M1 by the electric path and/or the electric energy from the battery apparatus 56 to drive the second electric motor M2 and, thereby, a torque is given to each of the driving wheels 34. Thereby, so-called torque assistance to assist the power of the engine 8 is enabled.

The hybrid control means 84 brings the first electric motor M1 into its non-load state, thereby, causes the first electric motor M1 to freely rotate, that is, rotate in idling and, thereby, can bring the differential portion 11 into: the state where the torque can not be transmitted, that is, the state similar to the state where the power transmission path in the differential portion 11 is blocked; and the state where no power is generated from the differential portion 11. By bringing the first electric motor M1 into its non-load state, the differential portion 11 can be brought into the neutralized state (neutral state) where the power transmission path thereof is electrically blocked.

To improve the fuel consumption efficiency during inertial running with the accelerator pedal off (coast running), during braking with a foot brake, etc., the hybrid control means 84 has a function as a regeneration control means of causing the second electric motor M2 to act as an electric generator by driving and rotating the second electric motor M2 using the kinetic energy of the vehicle, that is, a counter driving force transmitted from the driving wheels 34 to the engine 8; and charging the electric energy, that is, the electric current generated by the second electric motor M2 in the battery apparatus 56 through the inverter 54. This regeneration control is executed such that an amount of regenerated energy is acquired that is determined based on the braking force distribution, etc., of braking forces of the oil hydraulic brakes to acquire the braking forces corresponding to the charge capacity SOC of the battery apparatus 56 and the amount of operation on the brake pedal.

Returning back to FIG. 7, a gear shifting end determining means 88 determines whether the control comes to an end by the multiple-speed gear shifting control means 82 on the gear shifting of the automatic hear shifting portion 20. The gear shifting end determining means 88 determines whether the control comes to an end by the multiple-speed gear shifting control means 82 on the gear shifting by the automatic hear shifting portion 20, based on, for example, whether a predetermined gear shifting time period elapses of the automatic gear shifting portion 20 that is acquired in advance in experiments, etc., or whether the actual input rotation speed $N_{IN}$ of the automatic gear shifting portion 20, that is, the rotation speed $N_{M2}$ of the second electric motor M2 detected by the M2 rotation speed sensor 48 substantially synchronizes with the input rotation speed $N_{IN}$ of the automatic gear shifting portion 20 after the gear shifting (that is, the input rotation speed $N_{IN}$ of the automatic gear shifting portion 20 that is uniquely determined using the vehicle speed V and the transmission gear ratio γ of the automatic gear shifting portion 20 after the gear shifting).

For the variation of the output rotation speed of the differential portion 11, that is, the rotation speed $N_{18}$ of the transmitting portion 18 (=the rotation speed $N_{M2}$ of the second electric motor M2) caused by, for example, the gear shifting, etc., of the automatic gear shifting portion 20, the hybrid control means 84 (engine rotation speed control means 86) calculates the amount of divergence (control deviation) e between the actual rotation speed $N_E$ and the target rotation speed $N_{ELINE}$ of the engine 8 at a predetermined time point (for example, at a time point at which the end of the gear shifting is determined by the gear shifting end determining means 88 described as follows), and sets a convergence delaying target rotation speed $N_{ELINE}'$ of the engine 8 such that the amount of divergence e relatively mildly converges at a predetermined slope. For example, the convergence delaying target rotation speed $N_{ELINE}'$ $(=N_E+N_0\pm\Delta N_S)$ is calculated by adding an intial value $N_0$ (=the engine target rotation speed at the time when the gear shifting comes to an end-the actual engine rotation speed at the time when the gear shifting comes to an end) and a predetermined amount of sweeping $\Delta N_S$, to the actual engine rotation speed $N_E$ at the time point. As to the amount of sweeping $\Delta N_S$, a predetermined value thereof is determined corresponding to whether the amount of divergence e at a time when the gear shifting of the automatic gear shifting portion 20 comes to end is positive or negative. Preferably, this control is executed when the amount of divergence e is equal to or larger than a predetermined value that is determined in advance at the predetermined time point. Preferably, the convergence delaying target rotation speed $N_{ELINE}'$ of the engine 8 is set such that the convergence of the amount of divergence e is delayed compared to that of the case where no control is executed (the case where the engine target rotation speed $N_{ELINE}$ is set by ordinary control without executing the control of the embodiment) as described later with reference to FIG. 10, etc. Preferably, the control for the convergence comes to an end at the time point when the amount of divergence e becomes equal to or smaller than the predetermined value that is determined in advance.

For example, in the case where the amount of divergence e is large during control for downward gear shifting after an operation for an increase of the speed such as stepping on the accelerator pedal, etc., when the ordinary feedback control is executed such that the amount of divergence e converges as quickly as possible, the actual engine rotation speed $N_E$ is relatively rapidly varied toward the target rotation speed $N_{ELINE}$ and, simultaneously, due to this, the energy is consumed. Therefore, the output torque of the automatic gear shifting portion 20 does not increase. Therefore, it is considered that adverse effects arise such as degradation of the acceleration performance. The control for the convergence by the hybrid control means 84 is executed to control the occurrence of the adverse effects, and suppresses fluctuation of the torque of the output shaft 22 by setting the convergence delaying target rotation speed $N_{ELINE}'$ to dare to delay the convergence of the amount of divergence e.

The engine rotation speed control means 86 calculates the amount of divergence e between the actual rotation speed $N_E$ and the target rotation speed $N_{ELINE}$ of the engine 8 and sets the convergence delaying target rotation speed $N_{ELINE}'$ corresponding to the amount of divergence e at, for example, the time point at which the determination by the gear shifting end determining means 88 is affirmed, that is, the time point at which the gear shifting of the automatic gear shifting portion 20 comes to an end. Preferably, this control is executed when the control is executed that uses the engine inertia during the gear shifting of the automatic gear shifting portion 20 (for example, the torque phase compensating control during the upward shifting, the inertia phase compensating control during the downward shifting, etc.). Preferably, the convergence delaying target rotation speed $N_{ELINE}'$ of the engine 8 is set such that the amount of divergence e between the actual rotation speed $N_E$ and the target rotation speed $N_{ELINE}$ of the engine 8 is constant (at the predetermined value that is determined in advance) for a predetermined time period after the time point at which the gear shifting of the automatic gear shifting portion 20 comes to an end. Preferably, the "time point at which the gear shifting of the automatic gear shifting portion 20 comes to an end" refers to, as above, the time point at which the input rotation speed $N_{IN}$ of the automatic gear shifting portion 20 (=the rotation speed $N_{M2}$ of the second electric motor M2) reaches a predetermined synchronized rotation speed. However, the amount of divergence e between the actual rotation speed $N_E$ and the target rotation speed $N_{ELINE}$ of the engine 8 may be calculated and the setting of the convergence delaying target rotation speed $N_{ELINE}'$ may be executed corresponding to the amount of divergence e immediately before the input rotation speed $N_{IN}$ reaches the synchronized rotation speed.

Figure 10:
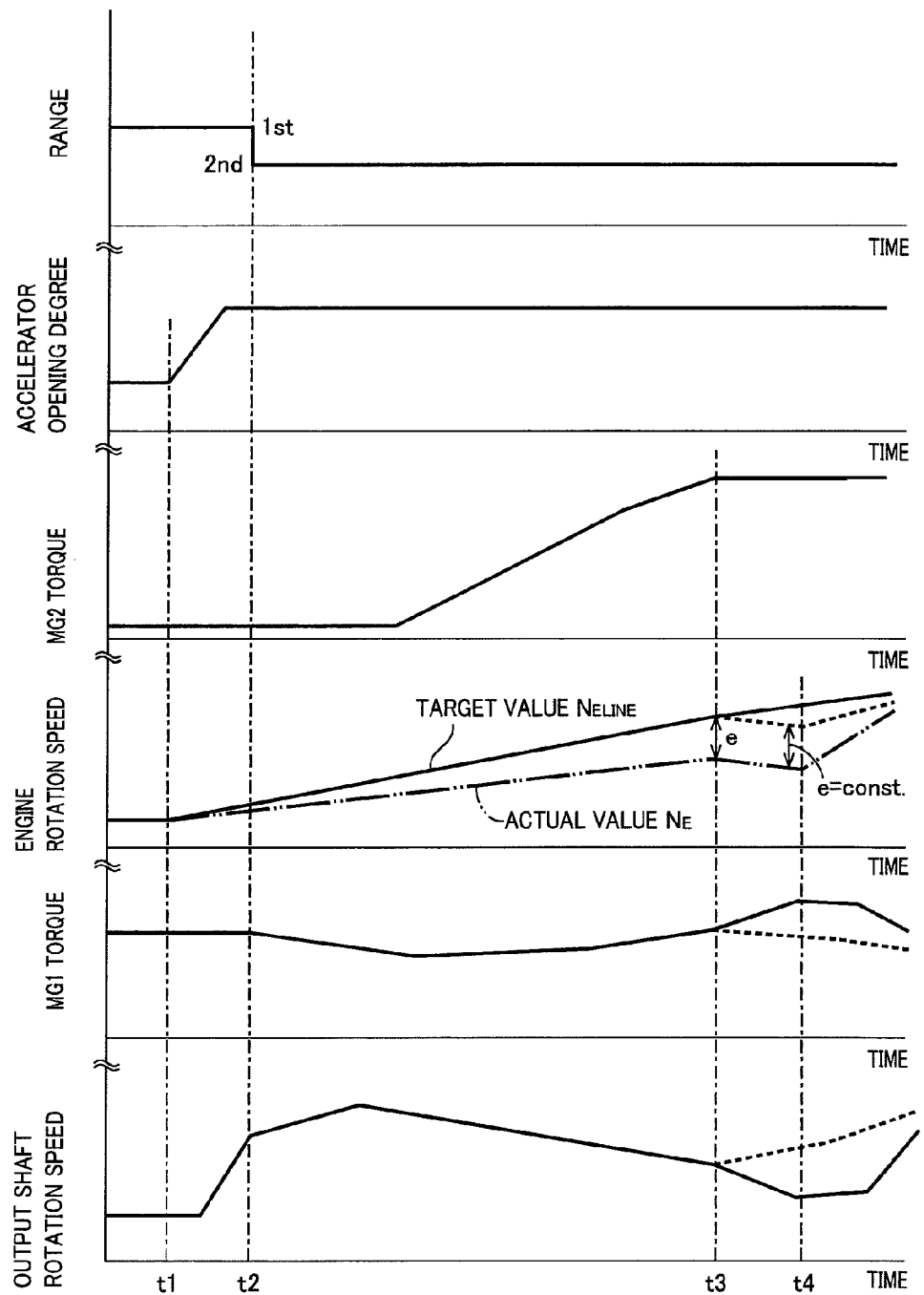
FIG. 10 is a timing chart for explaining control of the engine rotation speed of the embodiment executed for the gear shifting of the automatic gear shifting portion included in the power transmitting apparatus of FIG. 1.

FIG. 10 is a timing chart for explaining the control of the engine rotation speed of the embodiment executed for the gear shifting of the automatic gear shifting portion 20. In the control depicted in FIG. 10, at a time point t1, the accelerator opening degree $A_{CC}$ is first increased by execution of stepping on of the accelerator pedal, etc. At t2 immediately after the time point t1, a downward gear shifting order is issued for gear shifting from the second speed (2nd) to the first speed (1st) of the automatic gear shifting portion 20. In the control depicted in FIG. 10, the gear shifting order is output immediately after the increase of the accelerator opening degree $A_{CC}$ and, therefore, the target value $N_{ELINE}$ of the engine rotation speed is set to relatively mildly increase such that the actual value $N_E$ is gradually increased until the gear shifting comes to an end (for the time period to a time point t3). At the time point t3, the rotation speed M2 of the second electric motor M2 (=the input rotation speed $N_{IN}$ of the automatic gear shifting portion 20) reaches the predetermined synchronization rotation speed and the gear shifting of the automatic gear shifting portion 20 comes to an end. In the control of the embodiment, at the time point t3, the amount of divergence e between the actual rotation speed $N_E$ and the target rotation speed $N_{ELINE}$ of the engine 8 is calculated. Until a time point t4 after a predetermined time period elapses from the time point t3, the convergence delaying target rotation speed $N_{ELINE}'$ of the engine 8 is controlled such that the amount of divergence e is constant (at the predetermined value that is determined in advance). FIG. 11 is a chart of the correspondence relation between a time period [ms] elapsed from the time when the gear shifting of the automatic gear shifting portion 20 comes to an end, and an amount of diverging rotation speed reduced, that is, the amount of sweeping $\Delta N_S$ of the engine rotation speed $N_E$. In the control depicted in FIG. 10, the amount of sweeping $\Delta N_S$ is set according to the relation depicted in FIG. 11 and, thereby, the amount of divergence e is maintained to be constant from the time point at which the gear shifting of the automatic gear shifting portion 20 comes to an end to the time when 1,000 [ms] elapses. In FIG. 10, as the result of the above control: the variations by time of the rotation speed of the engine 8, the torque of the first electric motor M1, and the rotation speed of the output shaft 22 are each represented by a dotted line; and their variations by time with the ordinary control (when the control of the embodiment is not executed) are each represented by a solid line. According to an aspect where the convergence delaying target rotation speed $N_{ELINE}'$ is set according to the control of the embodiment, it can be seen that the variations of the torque of the first electric motor M1 and the rotation speed of the output shaft 22 are mild before the time point t3 and to a time point thereafter. On the other hand, according to an aspect where the control of the embodiment is not executed, relatively rapid variations of the torque of the first electric motor M1 and the rotation speed of the output shaft 22 (especially, a rapid decrease of the output shaft rotation speed) occur after the time point t3. This is because the directly transmitted torque is varied by controlling the output of the first electric motor M1 such that the amount of divergence e is quickly reduced. Therefore, the relatively rapid variation of the output rotation speed can suitably be prevented by suppressing the variation of the directly transmitted torque by, as in the control of the embodiment, daring to set the convergence delaying target rotation speed $N_{ELINE}'$ of the engine 8 such that the convergence of the amount of divergence e is delayed.

FIG. 12 is a flowchart of an example of the control of the engine rotation speed by the electronic control apparatus 80 that corresponds to the timing chart of FIG. 10 and this flow is repeatedly executed at predetermined cycles.

At S1, it is determined whether the engine 8 is being driven. When the determination at S1 is denied, at S9, as another kind of control, for example, the control of the engine target rotation speed in the ordinary case (the case where the control of the embodiment is not executed) is executed and, thereafter, this routine comes to an end. However, when the determination at S1 is affirmed, at S2 that corresponds to the action of the gear shifting end determining means 88, it is determined whether the gear shifting of the automatic gear shifting portion 20 comes to an end. When the determination at S2 is denied, a process of S5 and those thereafter are executed. However, when the determination at S2 is affirmed, at S3, determination on the start of the engine target rotation speed varying control of the embodiment is turned on. At S4, the initial value $N_0$ of the engine target rotation speed $N_{ELINE}$ (=the engine target rotation speed at the time point at which the gear shifting comes to an end-the actual engine rotation speed at the time point at which the gear shifting comes to an end) is calculated and, thereafter, this routine comes to an end. In the process of S5, it is determined whether the determination on the start of the engine target rotation speed varying control of the embodiment is turned on. When the determination at S5 is denied, a process of S9 and those thereafter are executed. However, when the determination at S5 is affirmed, at S6, it is determined whether the amount of divergence e between the engine target rotation speed $N_{ELINE}$ and the actual engine rotation speed $N_E$ at the time point (=$N_{ELINE}$−$N_E$) is smaller than the predetermined value. When the determination at S6 is affirmed, the convergence delaying target rotation speed $N_{ELINE}'$ of the engine 8 is set at step S7 that corresponds to the action of the engine rotation speed control means 86 such that the amount of divergence e converges at a predetermined slope and, thereafter, this routine comes to an end. However, when the determination at S6 is denied, at S8, the determination on the start of the engine target rotation speed varying control of the embodiment is turned off and, thereafter, the process of S9 and those thereafter are executed.

Returning back to FIG. 7, an N-to-D switching determining means 90 determines whether switching by the automatic gear shifting portion 20 from its neutral state to its power transmission state is completed. In the shift operating apparatus 50, the shift lever 52 is switched from the "N" or the "P" position that is a non-running range to the "D" or the "R" position that is a running range, etc., and, thereby, the switching is executed from the neutral state to the power transmission state of the automatic gear shifting portion 20. It is determined whether the engagement is completed of each of the first and the second clutches C1 and C2 that each are a power transmission state switching clutch of the automatic gear shifting portion 20. The determination of the completion of the engagement of each of the first and the second clutches C1 and C2 is executed by determining, for example, whether the actual input rotation speed $N_{IN}$ of the automatic gear shifting portion 20, that is the rotation speed $N_{M2}$ of the second electric motor M2 that is detected by the M2 rotation speed sensor 48 is substantially synchronized with the input rotation speed $N_{IN}$ of the automatic gear shifting portion 20 after the establishment of the power transmission state (that is, the input rotation speed $N_{IN}$ of the automatic gear shifting portion 20 that is uniquely determined by the vehicle speed V and the transmission gear ratio γ of the automatic gear shifting portion 20 after the gear shifting).

The hybrid control means 84 calculates the amount of divergence e between the actual rotation speed $N_E$ and the target rotation speed $N_{ELINE}$ of the engine 8 at the time point at which the determination by the N-to-D switching determining means 90 is affirmed, that is, the time point at which the switching is completed of the automatic gear shifting portion 20 from its neutral state to its power transmission state; and executes the setting of said convergence delaying target rotation speed $N_{ELINE}'$ such that the amount of divergence e converges at the predetermined slope. For garage control and D-N-D shift control during the running, the setting is executed of the convergence delaying target rotation speed $N_{ELINE}'$ of the above-explained embodiment.

Figure 13:
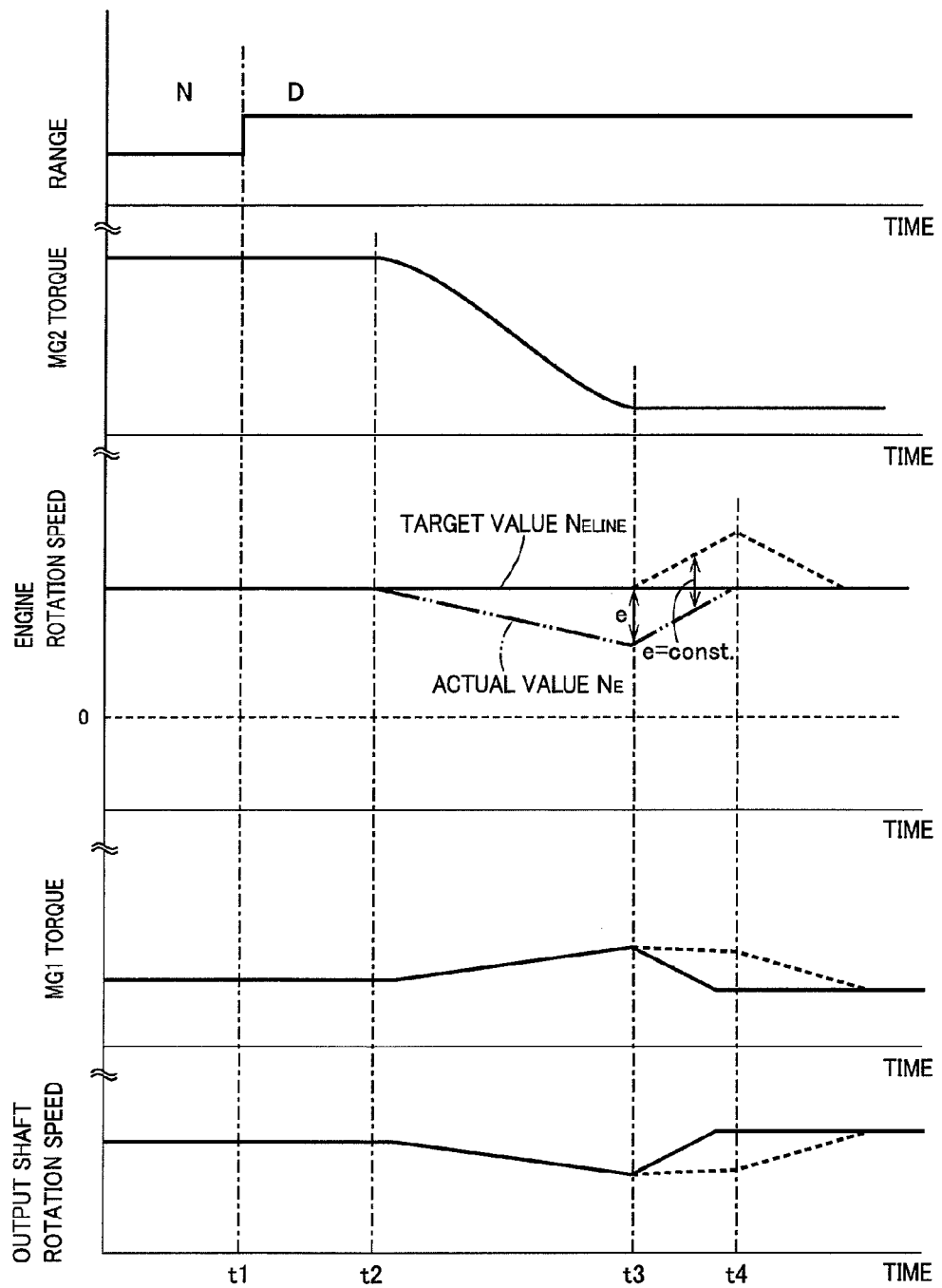
FIG. 13 is a timing chart for explaining the control of the engine rotation speed of the embodiment executed to switch from a neutral state to a power transmission state of the power transmitting apparatus of FIG. 1.

FIG. 13 is a timing chart for explaining the control of the engine rotation speed of the embodiment executed for switching from the neutral state to the power transmission state of the power transmitting apparatus 10. In the control depicted in FIG. 13, at the time point t1, in the shift operating apparatus 50, the shift lever 52 is switched from the "N" position that is the non-running range to the "D" position that is the running range. At the time point t2, the engagement of the first clutch C1 is started in the automatic gear shifting portion 20. Associated with the engagement of the first clutch C1, from the time point t2 to the time point t3, the torque of the second electric motor M2 is reduced and the torque of the first electric motor M1 is gradually increased. Associated with the variation of the rotation speed of the second electric motor M2, the actual rotation speed $N_E$ of the engine 8 is gradually reduced from the time point t2 to the time point t3. At the time point t3, the engagement of the first clutch C1 is completed and the variation of the rotation speed of the second electric motor M2 converges. In the control of the embodiment, at the time point t3, the amount of divergence e is calculated between the actual rotation speed $N_E$ and the target rotation speed $N_{ELINE}$ of the engine 8. The convergence delaying target rotation speed $N_{ELINE}'$ of the engine 8 is set such that the amount of divergence e is constant (at the predetermined value that is determined in advance) until the time point t4 after the predetermined time period elapses from the time point t3. In FIG. 13, as the result of the above control: the variations by time of the rotation speed of the engine 8, the torque of the first electric motor M1, and the rotation speed of the output shaft 22 are each represented by a dotted line; and their variations by time with the ordinary control (when the control of the embodiment is not executed) are each represented by a solid line. According to the aspect where the convergence delaying target rotation speed $N_{ELINE}'$ is set according to the control of the embodiment, it can be seen that the variations of the torque of the first electric motor M1 and the rotation speed of the output shaft 22 are mild before the time point t3 and to a time point thereafter. On the other hand, according to the aspect where the control of the embodiment is not executed, relatively rapid variations of the torque of the first electric motor M1 and the rotation speed of the output shaft 22 (especially, a rapid increase of the output shaft rotation speed)

occur after the time point t3. This is because the directly transmitted torque is varied by controlling the output of the first electric motor M1 such that the amount of divergence e is quickly reduced. Therefore, the relatively rapid variation of the output rotation speed can suitably be prevented by suppressing the variation of the directly transmitted torque by, as in the control of the embodiment, daring to set the convergence delaying target rotation speed $N_{ELINE}'$ of the engine 8 such that the convergence of the amount of divergence e is delayed.

Figure 14:
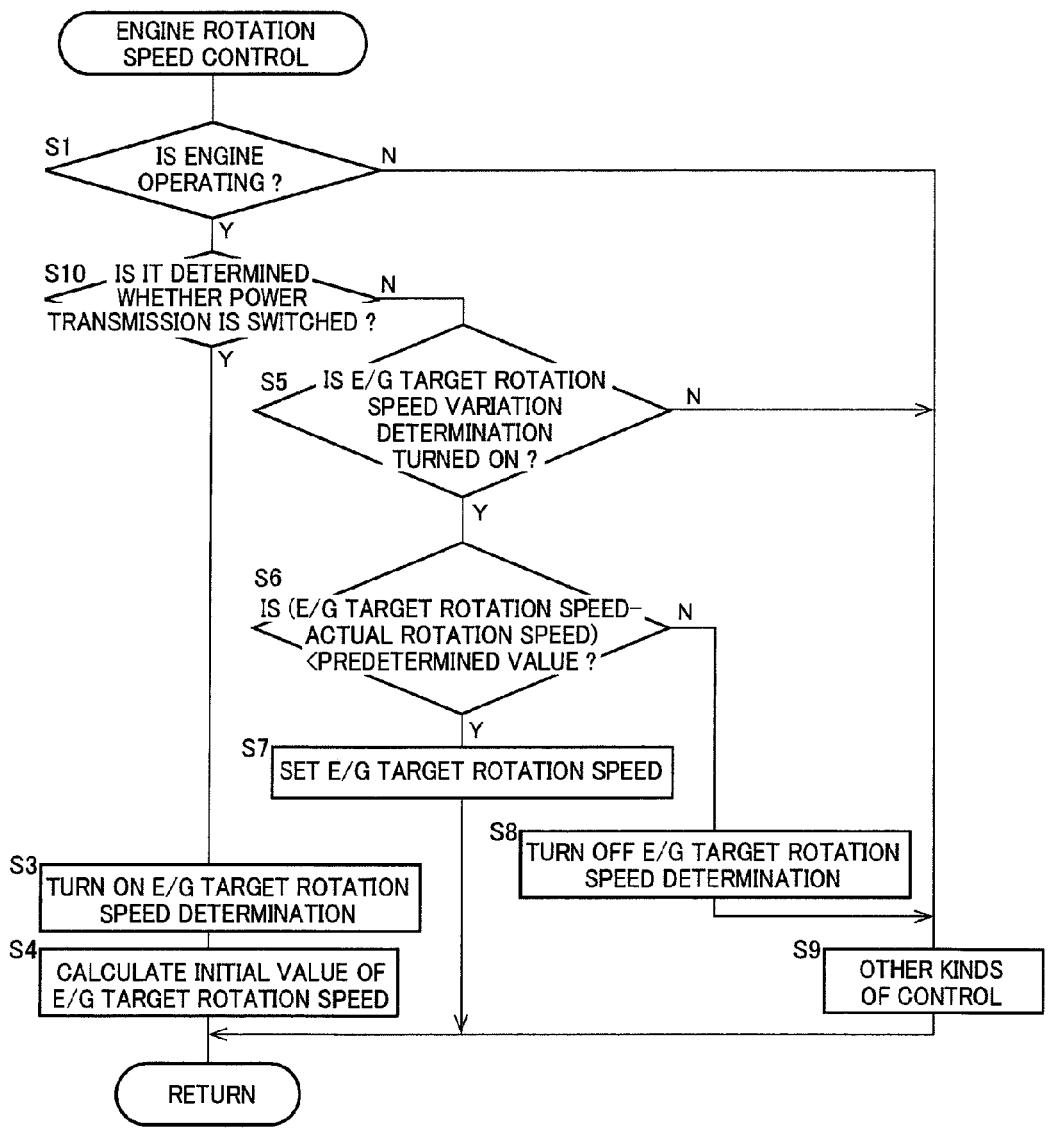
FIG. 14 is a flowchart of an example of the control of the engine rotation speed by the electronic control apparatus that corresponds to the timing chart of FIG. 13.

FIG. 14 is a flowchart of an example of the control of the engine rotation speed by the electronic control apparatus 80 that corresponds to the timing chart of FIG. 13 and the flow is repeatedly executed at predetermined cycles. In the control depicted in FIG. 14, steps that are common to the control depicted in FIG. 12 explained above are given the same reference numerals and will not again be described. In the control depicted in FIG. 14, when the determination at S1 is affirmed, at S10 that corresponds to the action of the N-to-D switching determining means 90, it is determined whether the switching of the automatic gear shifting portion 20 from its neutral state to its power transmission state is completed. When the determination at S10 is affirmed, the processes of S3 and those thereafter are executed. However, when the determination of S10 is denied, the processes at S5 and those thereafter are executed.

Retuning back to FIG. 7, a slip determining means 92 determines slips and their convergences of the wheels including the driving wheels 34, that is, the pair of front wheels and the pair of rear wheels each on the right and the left. More specifically, the slip determining means 92 determines whether the driving wheels 34, etc., slip on a road for the vehicle to run during the running of the vehicle by, for example, comparing the rotation speeds of the rear wheels with those of the front wheels that are detected by the wheel speed sensors 46. After detecting the slips of the wheels by executing as above, similarly, convergence of each of the slips is determined by comparing the rotation speeds of the rear wheels with those of the front wheels that are detected by the wheel speed sensors 46.

The hybrid control means 84 calculates the amount of divergence e between the actual rotation speed $N_E$ and the target rotation speed $N_{ELINE}$ of the engine 8 at the time point at which the determination by the slip determining means 92 is affirmed, that is, the time point at which the slips of the wheels converge, and executes the setting of the convergence delaying target rotation speed $N_{ELINE}'$ such that the amount of divergence e converges at the predetermined slope. When a wheel once slips and, thereafter, grips the road, the setting is executed of the convergence delaying target rotation speed $N_{ELINE}'$ of the above-explained embodiment.

Figure 15:
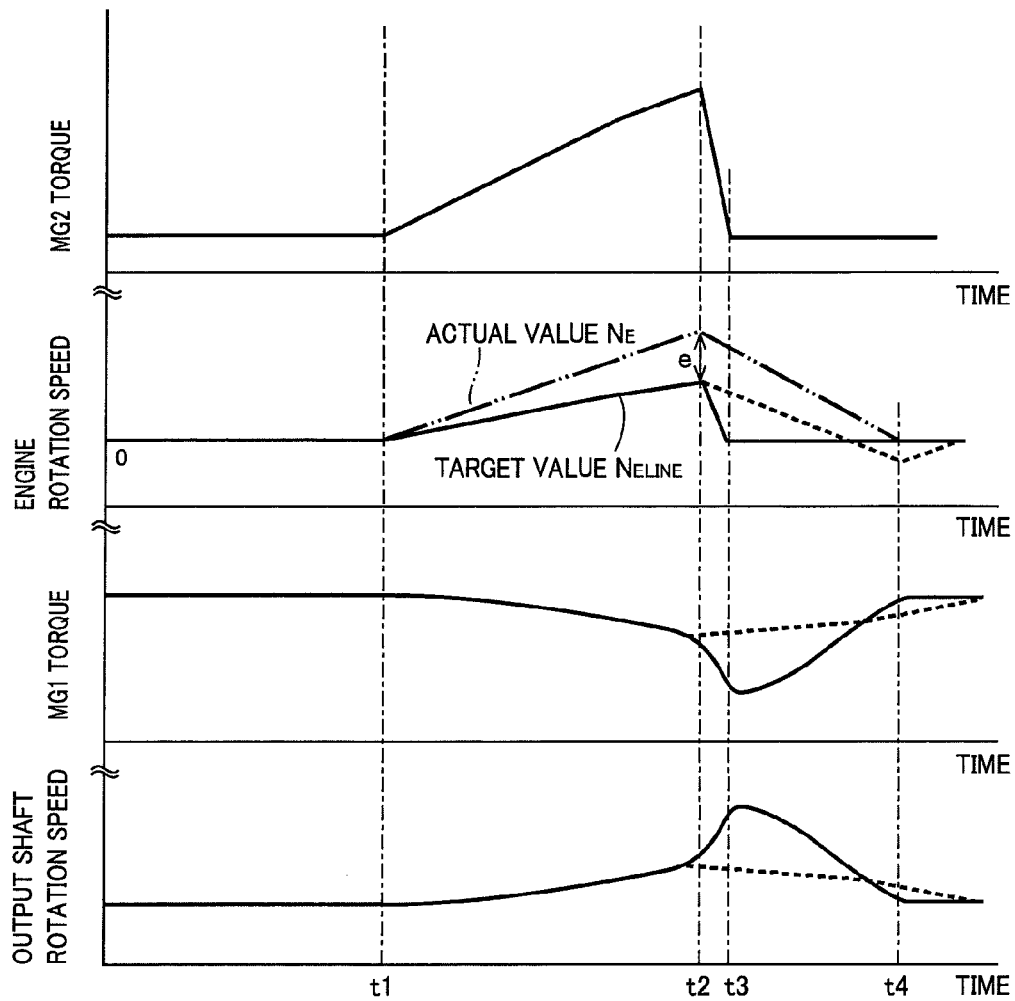
FIG. 15 is a timing chart for explaining control of the engine rotation speed of the embodiment executed when slipping converges of a wheel such as a driving wheel depicted in FIG. 7.

FIG. 15 is a timing chart for explaining control of the engine rotation speed of the embodiment executed when a slip of a wheel converges. In the control depicted in FIG. 15, at the time point t1, the wheel such as the driving wheel 34 slips. In response to this slip of the wheel, the torque of the second electric motor M2 is increased from the time point t1 to the time point t2 and, associated therewith, the actual rotation speed $N_E$ of the engine 8 is increased. When the slip of the wheel converges and the grip is restored at the time point t2, the state of the torque of the second electric motor M2 is changed from the increase to a reduction and the torque is relatively rapidly reduced until the time point t3. In the control of the embodiment, at the time point t2, the amount of divergence e is calculated between the actual rotation speed $N_E$ and the target rotation speed $N_{ELINE}$ of the engine 8. Until the time point t4 after a predetermined time period elapses from the time point t2, the convergence delaying target rotation speed $N_{ELINE}'$ of the engine 8 is set such that the amount of divergence e converges at a predetermined slope (for example, in a predetermined proportional relation). In FIG. 15, as the result of the above control: the variations by time of the rotation speed of the engine 8, the torque of the first electric motor M1, and the rotation speed of the output shaft 22 are each represented by a dotted line; and their variations by time with the ordinary control (when the control of the embodiment is not executed) are each represented by a solid line. According to an aspect where the convergence delaying target rotation speed $N_{ELINE}'$ is set according to the control of the embodiment, it can be seen that the variations of the torque of the first electric motor M1 and the rotation speed of the output shaft 22 are mild before the time point t2 and to a time point thereafter. On the other hand, according to an aspect where the control of the embodiment is not executed, relatively rapid variations occur of the torque of the first electric motor M1 and the rotation speed of the output shaft 22 (especially, a rapid increase of the output shaft rotation speed) after the time point t2. This is because the directly transmitted torque is varied by controlling the output of the first electric motor M1 such that the amount of divergence e is quickly reduced. Therefore, the relatively rapid variation of the output rotation speed can suitably be prevented by suppressing the variation of the directly transmitted torque by, as in the control of the embodiment, daring to set the convergence delaying target rotation speed $N_{ELINE}'$ of the engine 8 such that the convergence of the amount of divergence e is delayed.

Figure 16:
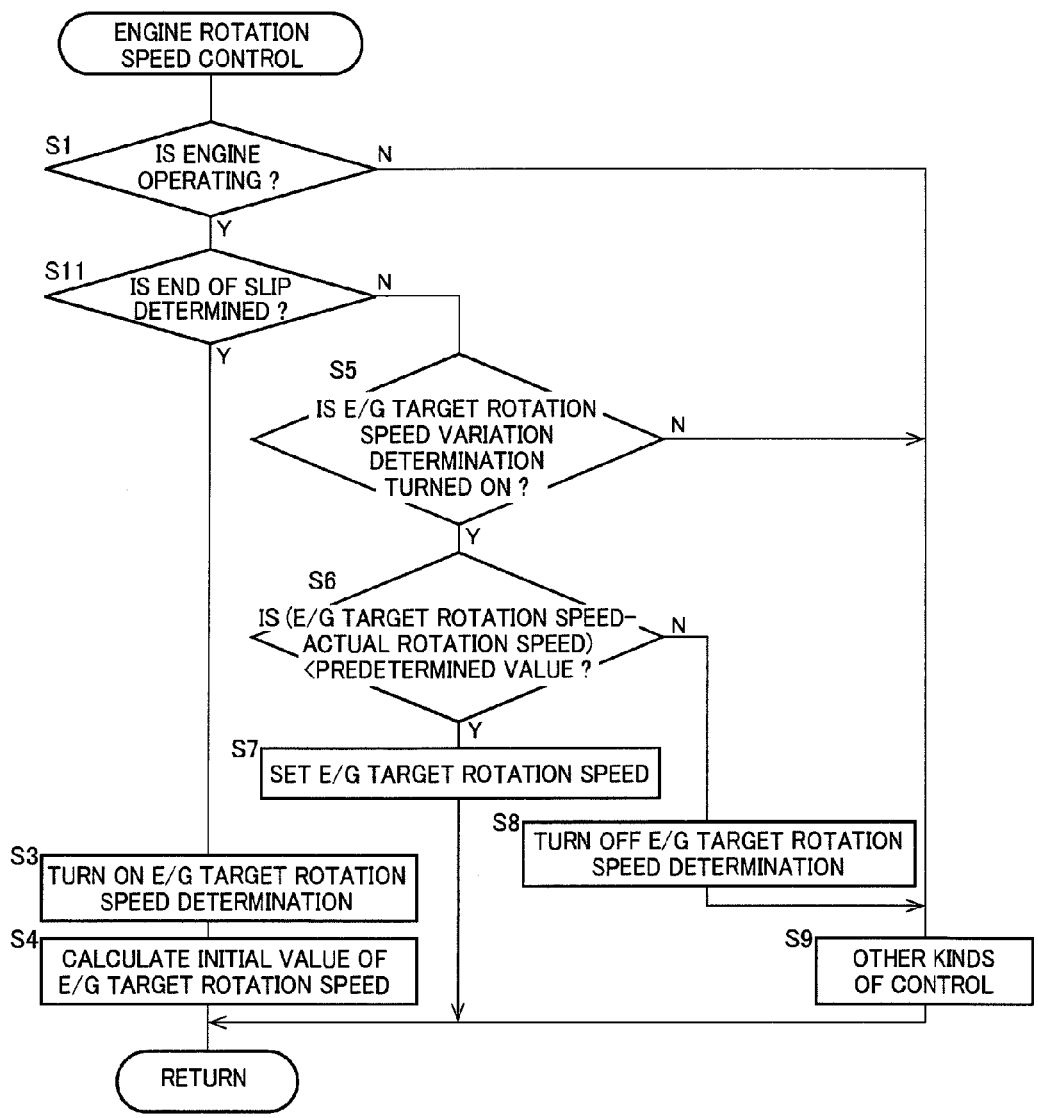
FIG. 16 is a flowchart of an example of control of the engine rotation speed executed by the electronic control apparatus that corresponds to the timing chart of FIG. 15.

FIG. 16 is a flowchart of an example of control of the engine rotation speed executed by the electronic control apparatus 80 that corresponds to the timing chart of FIG. 15 and the flow is repeatedly executed at predetermined cycles. In the control depicted in FIG. 16, steps that are common to the control depicted in FIG. 12 explained above are given the same reference numerals and will not again be described. In the control depicted in FIG. 16, when the determination at S1 is affirmed, at S11 that corresponds to the action of the slip determining means 92, it is determined whether the slip of the wheel such as the driving wheel 34, etc., converges. When the determination at S11 is affirmed, the process of S3 and those thereafter are executed. However, when the determination at S11 is denied, the process of S5 and those thereafter are executed.

As above, according the embodiment, for varying the output rotation speed $N_{18}$ of the differential portion 11, at a predetermined time point, the amount of divergence e between the actual rotation speed $N_E$ and the target rotation speed $N_{ELINE}$ of the engine 8 is calculated and the convergence delaying target rotation speed $N_{ELINE}'$ of the engine 8 is set such that the amount of divergence e converges at the predetermined slope. Therefore, for the control of the engine rotation speed by the first electric motor M1, etc., fluctuation of the rotation speed of the output shaft of the differential portion 11 can suitably be suppressed. The power transmitting apparatus 10 for a vehicle can be provided that suppresses the occurrence of the relatively rapid variation of the torque of the output shaft 22 when the output rotation speed of the differential portion 11 is varied.

For varying the output rotation speed $N_{18}$ of the differential portion 11, at the predetermined time point, the amount of divergence e is calculated between the actual rotation speed $N_E$ and the target rotation speed $N_{ELINE}$ of the engine 8 and the setting is executed of the convergence delaying target rotation speed $N_{ELINE}'$ of the engine 8 such that the convergence of the amount of divergence e is delayed compared to that without the control. Therefore, for the control of the engine rotation speed by the electric motor M1, etc., fluctuation of rotation speed of the output shaft of the differential portion 11 can suitably be suppressed in a practical aspect.

The automatic gear shifting portion 20 is included as the mechanical gear shifting portion that constitutes a portion of the power transmission path between the differential portion 11 and the driving wheels 34, and the predetermined time point is the time point at which the gear shifting of the automatic gear shifting portion 20 comes to an end. Therefore, fluctuation of the output shaft rotation speed of the differential portion 11 can suitably be suppressed for a time period after the gear shifting comes to an end during which relatively rapid torque variation of the output shaft 22 tends to occur.

For the predetermined time period from the time point at which the gear shifting of the automatic gear shifting portion 20 comes to an end, the convergence delaying target rotation speed $N_{ELINE}'$ of the engine 8 is set such that the amount of divergence e between the actual rotation speed $N_E$ and the target rotation speed $N_{ELINE}$ of the engine 8 is constant. Therefore, fluctuation of the rotation speed of the output shaft of the differential portion 11 can suitably be suppressed in a practical aspect for the time period after the gear shifting comes to an end during which relatively rapid torque variation of the output shaft 22 tends to occur.

When the gear shifting of the automatic gear shifting portion 20 comes to an end, the target rotation speed $N_{ELINE}$ of the engine 8 is set to be the value that is acquired by adding the predetermined value that is determined in advance to the actual rotation speed $N_E$ of the engine 8. Therefore, the amount of divergence can be reduced in the initial stage of the control and the convergence thereof can be expedited for the time period after the gear shifting comes to an end during which relatively rapid torque variation of the output shaft 22 tends to occur.

The predetermined time point is the time point at which the switching is completed of the automatic gear shifting portion 20 from its neutral state to its power transmission state. Therefore, the fluctuation of the rotation speed of the output shaft of the differential portion 11 can suitably be suppressed for a time period after the switching is completed from the neutral state to the power transmission state during which relatively rapid torque variation of the output shaft 22 tends to occur.

The predetermined time point is the time point at which the slip of a wheel such as the driving wheel 34 converges. Therefore, fluctuation of the rotation speed of the output shaft of the differential portion 11 can suitably be suppressed for a time period after the convergence of the wheel slip during which relatively rapid torque variation of the output shaft 22 tends to occur.

The preferred embodiments of the present invention have been described in detail as above with reference to the accompanying drawings. However, the present invention is not limited to the above and is implemented in other aspects.

For example, for the control of FIG. 10 in the above-explained embodiments, the example has been described where the target rotation speed $N_{ELINE}$ is swept to be reduced to delay the convergence of the amount of divergence e when the actual rotation speed $N_E$ of the engine 8 at the time point t3 is lower than the target rotation speed $N_{ELINE}$ thereof. However, the present invention is not limited to the this, and control is also executed of sweeping the target rotation speed $N_{ELINE}$ to be increased to delay the convergence of the amount of divergence e when the actual rotation speed $N_E$ is higher than the target rotation speed $N_{ELINE}$ of the engine 8 at the time point at which the gear shifting of the automatic gear shifting portion 20 comes to an end. The amount of sweeping $\Delta N_s$ in the control of the engine rotation speed of the embodiment is properly set corresponding to whether the amount of divergence e is positive or negative.

In the embodiment, the second electric motor M2 is directly coupled to the transmitting member 18. However, the position to couple the second electric motor M2 is not limited to the above and the second electric motor M2 may be coupled in the power transmission path between the differential portion 11 and the driving wheels 34 directly or indirectly through a transmission, etc.

In the embodiment, the differential portion 11 functions as an electric continuously variable transmission whose transmission gear ratio $\gamma 0$ can continuously be varied from its minimal value $\gamma 0_{min}$ to its maximal value $\gamma 0_{max}$. However, for example, even when the transmission gear ratio $\gamma 0$ of the differential portion 11 is adapted not to continuously vary but to dare to be varied stepwise using its differential action, the present invention is applicable to this differential portion 11.

In the embodiment, in the power distribution mechanism 16: the first carrier CA1 is coupled to the engine 8; the first sun gear S1 is coupled to the first electric motor M1; and the first ring gear R1 is coupled to the transmitting member 18. However, these coupling relations are not limited to those of the above aspect and, the engine 8, the first electric motor M1, and the transmitting member 18 may each be coupled to any one of these three elements CA1, S1, and R1 of the first planetary gear apparatus 24.

In the embodiment, the engine 8 is coupled to the input shaft 14. However, these elements only have to be operably coupled to each other through, for example, a gear, a belt, etc., and do not need to be disposed on a shaft center that is common thereto.

In the embodiment, the first and the second electric motors M1 and M2 are concentrically disposed on the input shaft 14, and the first electric motor M1 is coupled to the first sun gear S1 and the second electric motor M2 is coupled to the transmitting member 18. However, these elements do not need to always be disposed as above. For example, through a gear, a belt, a final reduction gear, etc., the first electric motor M1 may operably be coupled to the first sun gear S1 and the second electric motor M2 may be couple to the transmitting member 18.

In the embodiment, the automatic gear shifting portion 20 is coupled in series to the differential portion 11 through the transmitting portion 18. However, a counter shaft may be disposed in parallel to the input shaft 14 and the automatic gear shifting portion 20 may be concentrically disposed on the counter shaft. In this case, the differential portion 11 and the automatic gear shifting portion 20 are power-transmissibly coupled to each other through, for example, a set of transmitting member as the transmitting member 18 that is configured by a pair of counter gears, a sprocket and a chain, etc.

In the embodiment, the power distributing mechanism 16 is configured by a set of planetary gear apparatus. However, the power distributing mechanism 16 may also be an apparatus that is configured by two or more planetary gear apparatus (es) and that functions as a transmission that has three or more gear levels in its non-differential state (constant gear shifting state). The planetary gear apparatus thereof is not limited to that of the single pinion type and may be a double-pinion type planetary gear apparatus. Even when the power distributing mechanism 16 is configured by two or more planetary gear apparatuses as above, the power distributing mechanism 16 may be adapted to have each rotation element of these planetary gear apparatuses power-transmissibly coupled to the engine 8 and the first, the second electric motors M1 and M2, and the transmitting member 18, and be adapted to switch between the multiple-speed gear shifting and the continuously variable transmitting by the control of the clutch C and the brake B that are coupled to the rotation elements of the planetary gear apparatuses.

In the embodiment, the differential portion 11 and the automatic gear shifting portion 20 are adapted to be coupled in series to each other. However, the coupling is not especially limited to this configuration. The present invention is applicable to a power transmitting apparatus including a portion that functions as an electric differential portion as the entire power transmitting apparatus 10 and these elements do not need to each be mechanically independent. The positions for these elements to be disposed at and the disposition order thereof are also not especially limited.

Not exemplifying one by one, the present invention is implemented with various changes made thereto that are within the scope not departing from the purport thereof.

The invention claimed is:

1. A power transmitting apparatus for a vehicle disposed in a power transmission path between an engine and driving wheels of the vehicle, comprising:
    an electric differential portion having a rotating element;
    an electric control unit, configured with program logic, to perform:
    controlling a driving state through an electric motor coupled to the rotating element of the differential portion in order to change a differential state between an input rotation speed and an output rotation speed of the rotating element of the differential portion;
    calculating an amount of divergence between the actual rotation speed and the target rotation speed of the engine at a predetermined time point; and
    setting the target rotation speed of the engine so that the amount of divergence converges at a predetermined slope and the convergence of the amount of divergence is delayed compared to that without any control; and
    a mechanical gear shifting portion that constitutes a portion of the power transmission path between the electric differential(portion and the driving wheels, wherein
    the predetermined time point is a time point at which gear shifting of the mechanical shifting portion comes to an end, and
    at the time point at which the shifting of the mechanical shifting portion comes to an end, the electronic control unit sets the target rotation speed of the engine to be a value acquired by adding a predetermined value to the actual rotation speed of the engine.

2. The power transmitting apparatus for a vehicle of claim 1, wherein
    for a predetermined time period after the time point at which the shifting of the mechanical shifting portion comes to an end, the electronic control unit sets the target rotation speed of the engine so that the amount of divergence between the actual rotation speed and the target rotation speed of the engine is constant.

3. The power transmitting apparatus for a vehicle of claim 1, further comprising:
    a mechanical shifting portion that constitutes a portion of the power transmission path between the electric differential portion and the driving wheels, wherein
    the predetermined time point is a time point at which switching from a neutral state of the mechanical shifting portion to a power transmission state thereof is completed.

4. The power transmitting apparatus for a vehicle of claim 1, wherein the predetermined time point is a time point at which a slip of the driving wheels converges.

5. The power transmitting apparatus for a vehicle of claim 1, wherein
    the electronic control unit sets the target rotation speed of the engine at a time point when gear shifting ends and the amount of divergence between the actual rotation speed of the engine and the target rotation speed of the engine is equal to or more than a predetermined value.

6. The power transmitting apparatus for a vehicle of claim 2, wherein
    the electronic control unit sets the target rotation speed of the engine at a time point when gear shifting ends and the amount of divergence between the actual rotation speed of the engine and the target rotation speed of the engine is equal to or more than a predetermined value.

7. The power transmitting apparatus for a vehicle of claim 3, wherein
    the electronic control unit sets the target rotation speed of the engine at a time point when gear shifting ends and the amount of divergence between the actual rotation speed of the engine and the target rotation speed of the engine is equal to or more than a predetermined value.

8. The power transmitting apparatus for a vehicle of claim 4, wherein
    the electronic control unit sets the target rotation speed of the engine at a time point when gear shifting ends and the amount of divergence between the actual rotation speed of the engine and the target rotation speed of the engine is equal to or more than a predetermined value.

* * * * *